(12) United States Patent
Liang et al.

(10) Patent No.: US 10,104,556 B2
(45) Date of Patent: Oct. 16, 2018

(54) METHOD AND DEVICE FOR ELIMINATING INTER-SYSTEM NEIGHBOR CELL INTERFERENCE

(71) Applicant: Huawei Technologies Co., Ltd., Shenzhen (CN)

(72) Inventors: Yongming Liang, Shenzhen (CN); Lei Huang, Shenzhen (CN); Yi Wang, Shenzhen (CN); Jiayin Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 155 days.

(21) Appl. No.: 15/143,154

(22) Filed: Apr. 29, 2016

(65) Prior Publication Data

US 2016/0249227 A1 Aug. 25, 2016

Related U.S. Application Data

(63) Continuation of application No. PCT/CN2013/086217, filed on Oct. 30, 2013.

(51) Int. Cl.
*H04W 16/14* (2009.01)
*H04W 16/10* (2009.01)
(Continued)

(52) U.S. Cl.
CPC .......... *H04W 16/14* (2013.01); *H04B 17/345* (2015.01); *H04W 16/10* (2013.01);
(Continued)

(58) Field of Classification Search
CPC ... H04W 16/14; H04W 16/10; H04W 52/243; H04W 84/12; H04W 52/143; H04W 52/146; H04B 17/345
See application file for complete search history.

(56) References Cited

U.S. PATENT DOCUMENTS

2011/0021240 A1* 1/2011 Hiltunen ............. H04J 11/0086
455/522
2012/0213107 A1* 8/2012 Jang ...................... H04W 24/10
370/252
(Continued)

FOREIGN PATENT DOCUMENTS

| CN | 101707779 A | 5/2010 |
|---|---|---|
| CN | 102036249 A | 4/2011 |
| CN | 102547730 A | 7/2012 |

OTHER PUBLICATIONS

Cariou et al., "Carrier-oriented WiFi for cellular offload," doc.: IEEE 802.11-12/0910r0, PowerPoint presentation (Jul. 17, 2012).
(Continued)

*Primary Examiner* — Ajay Cattungal
(74) *Attorney, Agent, or Firm* — Leydig, Voit & Mayer, Ltd.

(57) ABSTRACT

The present disclosure provides a method and a device for eliminating inter-system neighbor cell interference. The method includes the following steps: receiving, by a first wireless access device, a first interference indication, where the first interference indication is sent by a first terminal when the first terminal detects that neighbor cell interference caused by a second terminal to the first terminal is greater than or equal to a preset threshold, the first interference indication is used for indicating that the first terminal suffers the neighbor cell interference; sending, by the first wireless access device, a decreasing interference indication to a second wireless access device corresponding to the second terminal when determining that the first terminal suffers the neighbor cell interference from the second terminal, so that the second wireless access device executes a decreasing interference strategy to eliminate neighbor cell interference between the first terminal and the second terminal.

20 Claims, 11 Drawing Sheets

(51) Int. Cl.
*H04B 17/345* (2015.01)
*H04W 52/24* (2009.01)
*H04W 84/12* (2009.01)
*H04W 52/14* (2009.01)

(52) U.S. Cl.
CPC ........ *H04W 52/243* (2013.01); *H04W 52/143* (2013.01); *H04W 52/146* (2013.01); *H04W 84/12* (2013.01)

(56) References Cited

U.S. PATENT DOCUMENTS

| | | | | |
|---|---|---|---|---|
| 2012/0213116 A1* | 8/2012 | Koo | ............... | H04B 1/1027 370/253 |
| 2012/0213162 A1* | 8/2012 | Koo | ............... | H04W 16/14 370/329 |
| 2012/0214489 A1* | 8/2012 | Koo | ............... | H04W 36/0083 455/436 |
| 2013/0176877 A1* | 7/2013 | Sadek | ............... | H04W 24/02 370/252 |
| 2013/0288742 A1* | 10/2013 | Yao | ............... | H04J 11/0023 455/553.1 |
| 2015/0373766 A1* | 12/2015 | Morita | ............... | H04W 76/14 370/330 |
| 2017/0311312 A1* | 10/2017 | Koo | ............... | H04W 72/082 |

OTHER PUBLICATIONS

Sayana et al., "Wi-Fi for Hotspot Deployments and Cellular Offload," doc.: IEEE 802.11-12/1126r0, PowerPoint presentation (Sep. 18, 2012).

"IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE std 802.11n-2009, pp. i-502, Institute of Electrical and Electronics Engineers, New York, New York (Oct. 29, 2009).

Hu et al., "Adjacent Frequency Interference Between IMT-2000 FDD and TDD Base Stations," Guangdong Communication Technology, vol. 22, Issue 11, pp. 19-22,44, China Academic Journal Electronic Publishing House, Beijing, China (Nov. 2002).

"Discussion on simplified authentication of WLAN access for intelligent," from http://www.cww.net.cn, Three Communications Technology Co., Ltd. Hangzhou, China (Jul. 18, 2011).

"Candiate Technologies for Future Radio Access (FRA)," PowerPoint presentation, NTT DOCOMO, Inc., Tokyo, Japan (Mar. 12, 2013).

"Information technology—Telecommunications and information exchange between systems—Local and metropolitan area networks—Specific requirements; Part 11: Wireless LAN Medium Access Control (MAC) and Physical Layer (PHY) specifications," International Standard, ISO/IEC 8802-11, IEEE Std 802.11, Second edition, pp. i-678, Institute of Electrical and Electronics Engineers, New York, New York (Aug. 1, 2005).

"IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 4: Further Higher Data Rate Extension in the 2.4 GHz Band," IEEE Std 802.11g-2003, pp. i-67, Institute of Electrical and Electronics Engineers, New York, New York (2003).

"802.11i; IEEE Standard for Information technology—Telecommunications and information exchange between systems—Local and metropolitan area networks—Specific requirements; Part 11: Wireless LAN Medium Access control (MAC) and Physical Layer (PHY) specifications; Amendment 6: Medium Access Control (MAC) Security Enhancements," IEEE Std 802.11i-2004, pp. i-175, Institute of Electrical and Electronics Engineers, New York, New York (Jul. 23, 2004).

"Meru: The same frequency networking and 802.11ac natural fit," from http://www.cww.net.cn (Aug. 30, 2012).

"IDC Problem Reporting," 3GPP TSG-RAN WG2 Meeting #81, Malta, R2-130122, $3^{rd}$ Generation Partnership Project, Valbonne, France (Jan. 28- Feb. 1, 2013).

"5G Vision, Requirements & Technologies," DoCoMo-Huawei-Samsung FtF, Samsung, Electronics Corp., PowerPoint presentation, Beijing, China (Jul. 9, 2012).

Wu et al., "Study of Adjacent Interference between CDMA and WCDMA in Outdoor Environment," Journal of Nanjing University of Posts and Telecommunications (Natural Science), vol. 27, Issue 6, pp. 49-53, China Academic Journal Electronic Publishing House, Beijing, China (Dec. 2007).

Xu, "WLAN anti-interference analysis," from http://www.cww.net.cn (Aug. 29, 2011).

* cited by examiner

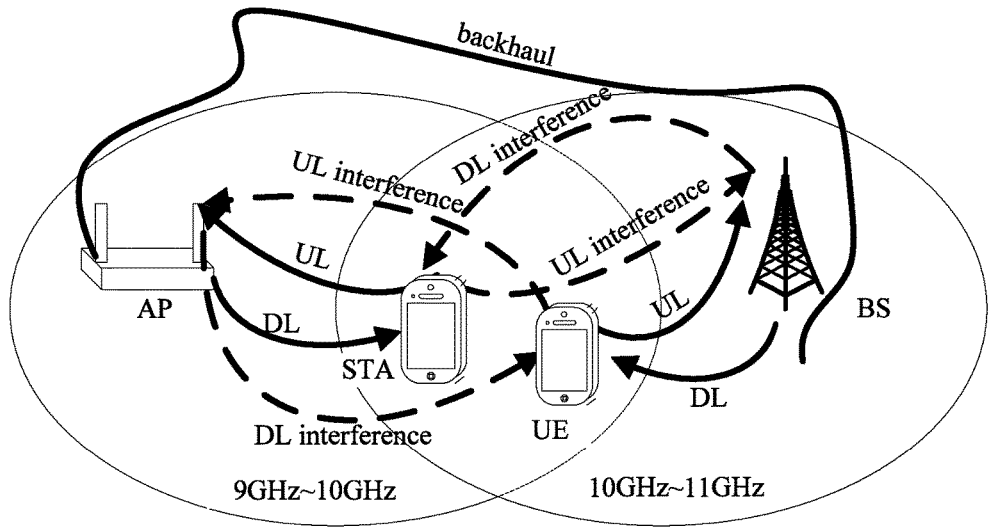

Fig. 1 a first wireless access device receives a first interference indication, where the first interference indication is sent by a first terminal when the first terminal detects that neighbor cell interference caused by a second terminal to the first terminal is greater than or equal to a preset threshold, the first interference indication is used for indicating that the first terminal suffers the neighbor cell interference, and the first wireless access device and the first terminal belong to a first wireless communication system — 201 the first wireless access device sends a decreasing interference indication to a second wireless access device corresponding to the second terminal when determining that the first terminal suffers the neighbor cell interference from the second terminal, so that the second wireless access device executes a decreasing interference strategy to eliminate neighbor cell interference between the first terminal and the second terminal, where the second wireless access device and the second terminal belong to a second wireless communication system — 202

Fig. 2 a second wireless access device receives a decreasing interference indication, where the decreasing interference indication is sent by a first wireless access device when the first wireless access device receives a first interference indication sent by a first terminal and determines that the first terminal suffers neighbor cell interference from a second terminal, the first interference indication is sent by the first terminal when the first terminal detects that neighbor cell interference caused by the second terminal to the first terminal is greater than or equal to a preset threshold, the first interference indication is used for indicating that the first terminal suffers the neighbor cell interference, the first wireless access device and the first terminal belong to a first wireless communication system, and the second wireless access device and the second terminal belong to a second wireless communication system ~301 the second wireless access device executes a decreasing interference strategy to eliminate neighbor cell interference between the first terminal and the second terminal ~302

Fig. 3

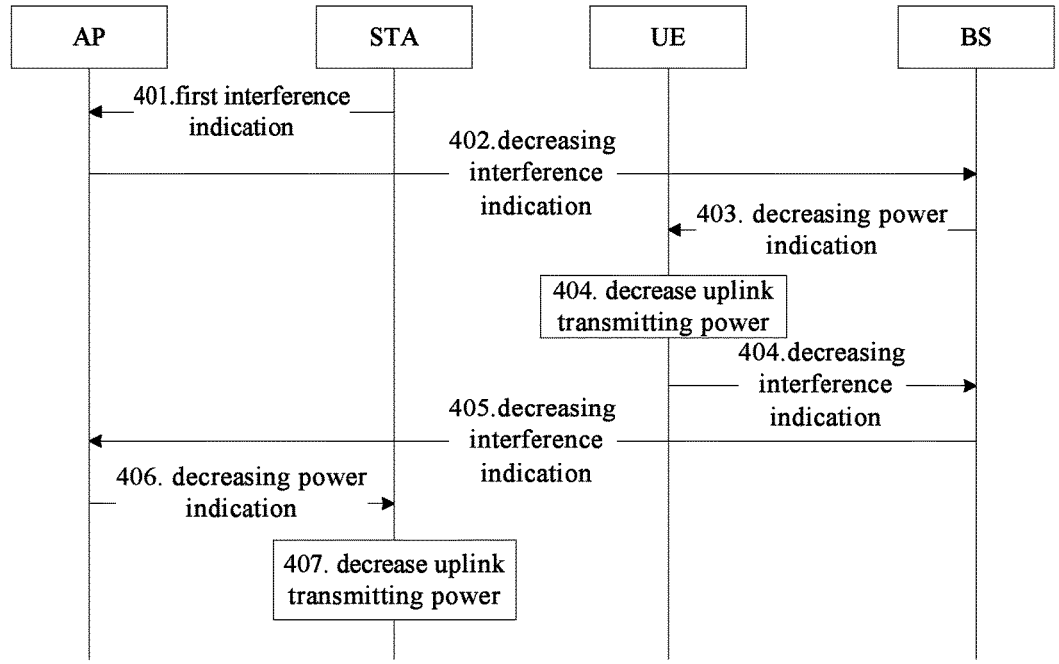

Fig. 4

METHOD AND DEVICE FOR ELIMINATING INTER-SYSTEM NEIGHBOR CELL INTERFERENCE

CROSS-REFERENCE TO RELATED APPLICATIONS

This application is a continuation of International Patent Application No. PCT/CN2013/086217, filed on Oct. 30, 2013, which is hereby incorporated by reference in its entirety.

TECHNICAL FIELD

The present disclosure relates to the field of wireless communications, and in particular, to a method and a device for eliminating inter-system neighbor cell interference.

BACKGROUND

Co-existence of a cellular network system and a wireless local area network (WLAN) system is always a hot topic and is widely discussed in conferences on 3GPP and IEEE standards. FIG. 1 is a schematic diagram of interference between a cellular network system and a WLAN system in the prior art. As shown in FIG. 1, a wireless station (STA) and a user equipment (UE) simultaneously send data and/or a signalling to an access point (AP) and a base station (BS), respectively. The STA and the UE are geographically close, and an authorized frequency band used by the BS and the UE in the cellular network system is adjacent to an unauthorized frequency band used by the AP and the STA in the WLAN system. For example, both a long term evolution (LTE) cellular network system and a WLAN system may be deployed on adjacent frequency bands near a 2.4 GHz frequency band. As for another example, the cellular network system will contend frequency bands over 6 GHz with the WLAN system in future. As shown in FIG. 1, the cellular network system employs an authorized frequency band ranging from 10 GHz to 11 GHz, while the WLAN system employs an unauthorized frequency band ranging from 9 GHz to 10 GHz. Therefore, the STA and the UE influence each other so that neighbor cell interference will be caused. For example, an uplink from the STA to the AP may interfere with an uplink from the UE to the BS, a downlink from the AP to the STA may interfere with a downlink from the BS to the UE, the uplink from the UE to the BS may also interfere with the uplink from the STA to the AP and the like, and the downlink from the BS to the UE may also interfere with the downlink from the AP to the STA.

To sum up, the above-mentioned interference is caused by that frequency bands of the two wireless communication systems are adjacent. Therefore, the above-mentioned interference is neighbor cell interference or neighbor frequency interference (Neighbor-Cell Interference, NCI).

Therefore, no matter at present or in the future, if frequency bands of the cellular network system and the WLAN system are adjacent, a problem of neighbor cell interference may always exist. Similarly, the problem of neighbor cell interference among two or more wireless communication systems in a same type and among two or more wireless communication systems in different types may also exist if frequency bands of which are adjacent. In addition, as shown in FIG. 1, although FIG. 1 merely shows a scenario that two wireless communication systems are non-co-located, in fact, two or more wireless communication systems may also be probably in a same location and co-located, for example, the BS may be co-located with the AP.

SUMMARY

Embodiments of the present disclosure provide a method and a device for eliminating inter-system neighbor cell interference, so as to achieve elimination of neighbor cell interference between wireless communication systems.

In a first aspect, an embodiment of the present disclosure provides a method for eliminating inter-system neighbor cell interference, including:

receiving, by a first wireless access device, a first interference indication, where the first interference indication is sent by a first terminal when the first terminal detects that neighbor cell interference caused by a second terminal to the first terminal is greater than or equal to a preset threshold, the first interference indication is used for indicating that the first terminal suffers the neighbor cell interference, and the first wireless access device and the first terminal belong to a first wireless communication system;

sending, by the first wireless access device, a decreasing interference indication to a second wireless access device corresponding to the second terminal when determining that the first terminal suffers the neighbor cell interference from the second terminal, so that the second wireless access device executes a decreasing interference strategy to eliminate neighbor cell interference between the first terminal and the second terminal, where the second wireless access device and the second terminal belong to a second wireless communication system.

In a first possible implementation manner of the first aspect, the first wireless communication system is a WLAN system, and the second wireless communication system is a cellular network system; or the first wireless communication system is a cellular network system, and the second wireless communication system is a WLAN system; or the first wireless communication system is a WLAN system, and the second wireless communication system is a WLAN system; or the first wireless communication system is a cellular network system, and the second wireless communication system is a cellular network system.

In a second possible implementation manner of the first aspect, the decreasing interference strategy includes at least one of the following strategies:

instructing the second terminal to decrease uplink transmitting power of the second terminal; or decreasing downlink transmitting power of the second wireless access device; or adjusting a frequency band of an uplink of the second terminal; or adjusting a frequency band of a downlink of the second terminal.

In combination with the second possible implementation manner of the first aspect, in a third possible implementation manner of the first aspect, the decreasing interference strategy is instructing the second terminal to decrease the uplink transmitting power of the second terminal or decreasing the downlink transmitting power of the second wireless access device, and after the sending the decreasing interference indication to the second wireless access device corresponding to the second terminal, the method further includes:

receiving, by the first wireless access device, a decreasing interference indication sent by the second wireless access device, where the decreasing interference indication is sent from the second terminal to the second wireless access device;

sending, by the first wireless access device, the decreasing interference indication to the first terminal, so that the first terminal decreases uplink transmitting power of the first terminal, or the first wireless access device decreases downlink transmitting power of the first wireless access device.

In a fourth possible implementation manner of the first aspect, before the sending, by the first wireless access device, the decreasing interference indication to the second wireless access device corresponding to the second terminal, the method further includes:

receiving, by the first wireless access device, interference information of neighbor cell interference sent by the first terminal;

determining, by the first wireless access device, that the first terminal suffers the neighbor cell interference from the second terminal according to the interference information of the neighbor cell interference.

In a second aspect, an embodiment of the present disclosure provides a method for eliminating inter-system neighbor cell interference, including:

receiving, by a second wireless access device, a decreasing interference indication, where the decreasing interference indication is sent by a first wireless access device when the first wireless access device receives a first interference indication sent by a first terminal and determines that the first terminal suffers neighbor cell interference from a second terminal, the first interference indication is sent by the first terminal when the first terminal detects that neighbor cell interference caused by the second terminal to the first terminal is greater than or equal to a preset threshold, the first interference indication is used for indicating that the first terminal suffers the neighbor cell interference, the first wireless access device and the first terminal belong to a first wireless communication system, and the second wireless access device and the second terminal belong to a second wireless communication system;

executing, by the second wireless access device, a decreasing interference strategy to eliminate neighbor cell interference between the first terminal and the second terminal.

In a first possible implementation manner of the second aspect, the first wireless communication system is a WLAN system, and the second wireless communication system is a cellular network system; or the first wireless communication system is a cellular network system, and the second wireless communication system is a WLAN system; or the first wireless communication system is a WLAN system, and the second wireless communication system is a WLAN system; or the first wireless communication system is a cellular network system, and the second wireless communication system is a cellular network system.

In a second possible implementation manner of the second aspect, the decreasing interference strategy includes at least one of the following strategies:

instructing the second terminal to decrease uplink transmitting power of the second terminal; or decreasing downlink transmitting power of the second wireless access device; or adjusting a frequency band of an uplink of the second terminal; or adjusting a frequency band of a downlink of the second terminal.

In combination with the second possible implementation manner of the second aspect, in a third possible implementation manner of the second aspect, the decreasing interference strategy is instructing the second terminal to decrease the uplink transmitting power of the second terminal and/or decreasing the downlink transmitting power of the second wireless access device, and after the executing, by the second wireless access device, the decreasing interference strategy, the method further includes:

receiving, by the second wireless access device, a decreasing interference indication sent by the second terminal;

sending, by the second wireless access device, the decreasing interference indication to the first wireless access device, so that the first wireless access device instructs the first terminal to decrease uplink transmitting power of the first terminal, or the first wireless access device decreases downlink transmitting power of the first wireless access device.

In combination with the second possible implementation manner of the second aspect, in a fourth possible implementation manner of the second aspect, the adjusting the frequency band of the uplink of the second terminal includes increasing the frequency band of the uplink of the second terminal, or the adjusting the frequency band of the downlink of the second terminal includes increasing the frequency band of the downlink of the second terminal, and after the executing, by the second wireless access device, the decreasing interference strategy, the method further includes:

receiving, by the second wireless access device, a decreasing interference indication sent by the second terminal;

sending, by the second wireless access device, the decreasing interference indication to a third wireless access device when determining that the second terminal suffers neighbor cell interference from a third terminal, so that the third wireless access device decreases downlink transmitting power of the third wireless access device, or the third wireless access device instructs the third terminal to decrease uplink transmitting power of the third terminal.

In a third aspect, an embodiment of the present disclosure provides a method for eliminating inter-system neighbor cell interference, where the method includes:

receiving, by a first wireless access device, a first interference indication, where the first interference indication is sent by a first terminal when the first terminal detects that neighbor cell interference caused by a second terminal to the first terminal is greater than or equal to a preset threshold, the first interference indication is used for indicating that the first terminal suffers the neighbor cell interference, and the first wireless access device and the first terminal belong to a first wireless communication system;

increasing, by the first wireless access device, a frequency band of an uplink of the first terminal or a frequency band of a downlink of the first terminal to eliminate neighbor cell interference between the first terminal and the second terminal;

receiving, by the first wireless access device, a decreasing interference indication sent by the first terminal;

sending, by the first wireless access device, the decreasing interference indication to a third wireless access device corresponding to a third terminal when determining that the first terminal suffers neighbor cell interference from the third terminal, so that the third wireless access device decreases downlink transmitting power of the third wireless access device, or the third wireless access device instructs the third terminal to decrease uplink transmitting power of the third terminal, and the third terminal and the third wireless access device belong to a third wireless communication system.

In a fourth aspect, an embodiment of the present disclosure provides a device for eliminating inter-system neighbor cell interference, including:

a first receiving unit, configured to receive a first interference indication, where the first interference indication is sent by a first terminal when the first terminal detects that neighbor cell interference caused by a second terminal to the first terminal is greater than or equal to a preset threshold, the first interference indication is used for indicating that the first terminal suffers the neighbor cell interference, and the first wireless access device and the first terminal belong to a first wireless communication system;

a first sending unit, configured to send a decreasing interference indication to a second wireless access device corresponding to the second terminal when determining that the first terminal suffers the neighbor cell interference from the second terminal, so that the second wireless access device executes a decreasing interference strategy to eliminate neighbor cell interference between the first terminal and the second terminal, and the second wireless access device and the second terminal belong to a second wireless communication system.

In a first possible implementation manner of the fourth aspect, the first wireless communication system is a WLAN system, and the second wireless communication system is a cellular network system; or the first wireless communication system is a cellular network system, and the second wireless communication system is a WLAN system; or the first wireless communication system is a WLAN system, and the second wireless communication system is a WLAN system; or the first wireless communication system is a cellular network system, and the second wireless communication system is a cellular network system.

In a second possible implementation manner of the fourth aspect, the decreasing interference strategy includes at least one of the following strategies:

instructing the second terminal to decrease uplink transmitting power of the second terminal; or decreasing downlink transmitting power of the device; or adjusting a frequency band of an uplink of the second terminal; or adjusting a frequency band of a downlink of the second terminal.

In combination with the second possible implementation manner of the fourth aspect, in a third possible implementation manner of the fourth aspect, the decreasing interference strategy is instructing the second terminal to decrease the uplink transmitting power of the second terminal or decreasing the downlink transmitting power of the second wireless access device, and the device further includes:

a second receiving unit, configured to receive a decreasing interference indication sent by the second wireless access device, where the decreasing interference indication is sent from the second terminal to the second wireless access device;

a second sending unit, configured to send the decreasing interference indication to the first terminal, so that the first terminal decreases uplink transmitting power of the first terminal, or the device decreases downlink transmitting power of the device.

In a fourth possible implementation manner of the fourth aspect, the first receiving unit, further configured to receive interference information of neighbor cell interference sent by the first terminal;

the first sending unit, further configured to determine that the first terminal suffers the neighbor cell interference from the second terminal according to the interference information of neighbor cell interference.

In a fifth aspect, an embodiment of the present disclosure provides a device for eliminating inter-system neighbor cell interference, including:

a first receiving unit, configured to receive a decreasing interference indication, where the decreasing interference indication is sent by a first wireless access device when the first wireless access device receives a first interference indication sent by a first terminal and determines that the first terminal suffers neighbor cell interference from a second terminal, the first interference indication is sent by the first terminal when the first terminal detects that neighbor cell interference caused by the second terminal to the first terminal is greater than or equal to a preset threshold, the first interference indication is used for indicating that the first terminal suffers the neighbor cell interference, the first wireless access device and the first terminal belong to a first wireless communication system, and the second wireless access device and the second terminal belong to a second wireless communication system;

a processing unit, configured to execute a decreasing interference strategy to eliminate neighbor cell interference between the first terminal and the second terminal.

In a first possible implementation manner of the fifth aspect, the first wireless communication system is a WLAN system, and the second wireless communication system is a cellular network system; or the first wireless communication system is a cellular network system, and the second wireless communication system is a WLAN system; or the first wireless communication system is a WLAN system, and the second wireless communication system is a WLAN system; or the first wireless communication system is a cellular network system, and the second wireless communication system is a cellular network system.

In a second possible implementation manner of the fifth aspect, the decreasing interference strategy includes at least one of the following strategies:

instructing the second terminal to decrease uplink transmitting power of the second terminal; or decreasing downlink transmitting power of the device; or adjusting a frequency band of an uplink of the second terminal or a frequency band of a downlink of the second terminal.

In combination with the second possible implementation manner of the fifth aspect, in a third possible implementation manner of the fifth aspect, the decreasing interference strategy is instructing the second terminal to decrease the uplink transmitting power of the second terminal and/or decreasing the downlink transmitting power of the device, and the device further includes:

a second receiving unit, configured to receive a decreasing interference indication sent by the second terminal;

a sending unit, configured to send the decreasing interference indication to the first wireless access device, so that the first wireless access device instructs the first terminal to decrease uplink transmitting power of the first terminal, or the first wireless access device decreases downlink transmitting power of the first wireless access device.

In combination with the second possible implementation manner of the fifth aspect, in a fourth possible implementation manner of the fifth aspect, the adjusting the frequency band of the uplink of the second terminal includes increasing the frequency band of the uplink of the second terminal, or the adjusting the frequency band of the downlink of the second terminal includes increasing the frequency band of the downlink of the second terminal, and the device further includes:

a third receiving unit, configured to receive a decreasing interference indication sent by the second terminal;

a second sending unit, configured to send the decreasing interference indication to a third wireless access device when determining that the second terminal suffers neighbor cell interference from a third terminal, so that the third wireless access device decreases downlink transmitting power of the third wireless access device, or the third wireless access device instructs the third terminal to decrease uplink transmitting power of the third terminal.

In a sixth aspect, an embodiment of the present disclosure provides a device for eliminating inter-system neighbor cell interference, including:

a first receiving unit, configured to receive a first interference indication, where the first interference indication is sent by a first terminal when the first terminal detects that neighbor cell interference caused by a second terminal to the first terminal is greater than or equal to a preset threshold, and the first interference indication is used for indicating that the first terminal suffers the neighbor cell interference, and the first wireless access device and the first terminal belong to a first wireless communication system;

a scheduling unit, configured to increase a frequency band of an uplink of the first terminal or a frequency band of a downlink of the first terminal to eliminate neighbor cell interference between the first terminal and the second terminal;

a second receiving unit, configured to receive a decreasing interference indication sent by the first terminal;

a sending unit, configured to send the decreasing interference indication to a third wireless access device corresponding to a third terminal when determining that the first terminal suffers neighbor cell interference from the third terminal, so that the third wireless access device decreases downlink transmitting power of the third wireless access device, or the third wireless access device instructs the third terminal to decrease uplink transmitting power of the third terminal, and the third terminal and the third wireless access device belong to a third wireless communication system.

According to the above-mentioned technical solutions, when a terminal finds itself suffering neighbor cell interference caused by that a terminal of other wireless communication systems communicates with a wireless access device serving the terminal, it initiates a process of eliminating interference to its own wireless access device and corresponding decreasing interference strategies are executed, thereby eliminating or decreasing neighbor cell interference between wireless communication systems. Therefore, the technical solutions of the present disclosure are capable of eliminating or decreasing neighbor cell interference between two wireless communication systems, thereby ensuring a quality of service during uplink communication or downlink communication between the terminal and the wireless access device.

BRIEF DESCRIPTION OF DRAWINGS

To illustrate technical solutions of embodiments of the present disclosure more clearly, a brief introduction on the accompanying drawings which are needed in the embodiments will be given below. Apparently, the accompanying drawings in the description below are merely some of the embodiments of the present disclosure, based on which other drawings may be obtained by those skilled in the art without any inventive efforts.

FIG. 1 is a schematic diagram of interference between a cellular network system and a WLAN system in the prior art;

FIG. 2 is a schematic flow diagram of method 1 for eliminating inter-system neighbor cell interference provided in an embodiment of the present disclosure;

FIG. 3 is a schematic flow diagram of method 2 for eliminating inter-system neighbor cell interference provided in an embodiment of the present disclosure;

FIG. 4 is a schematic flow diagram of embodiment 1 of a method for eliminating inter-system neighbor cell interference provided in an embodiment of the present disclosure;

DESCRIPTION OF EMBODIMENTS

Figure 5:
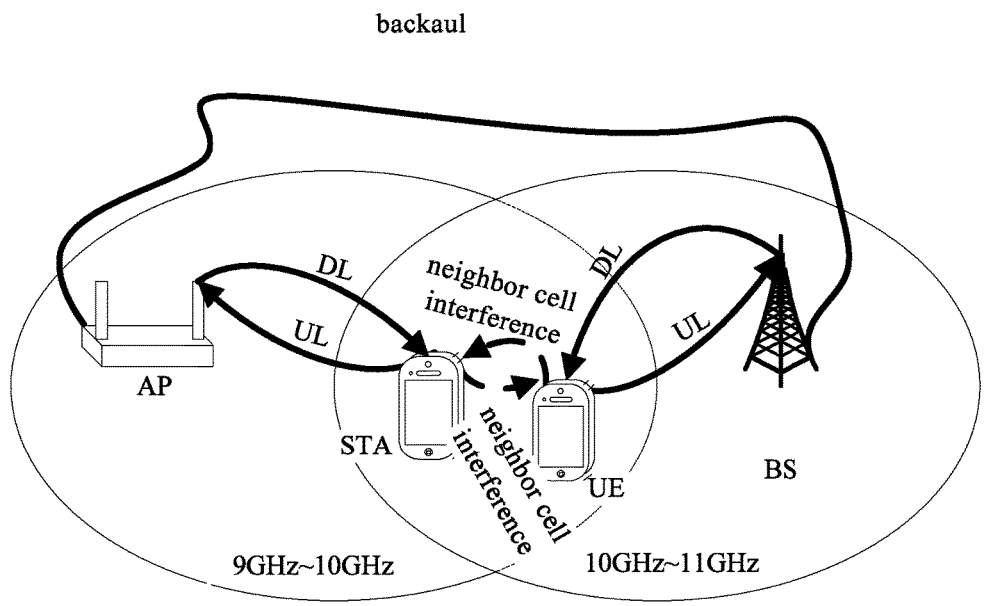
FIG. 5 is a schematic diagram of interference of embodiment 1 of a method for eliminating inter-system neighbor cell interference provided in an embodiment of the present disclosure.

To understand technical solutions of the present disclosure better, a detailed description of embodiments of the present disclosure will be given below in combination with the accompanying drawings.

It should be noted that embodiments described herein are merely a part, but not all, of the embodiments of the present disclosure. All of other embodiments, obtained by those skilled in the art based on the embodiments of the present disclosure without any inventive efforts, fall into the protection scope of the present disclosure.

An embodiment of the present disclosure provides a method for eliminating inter-system neighbor cell interference. Referring to FIG. 2, it is a schematic flow diagram of method 1 for eliminating inter-system neighbor cell interference provided in the embodiment of the present disclosure. As shown in the figure, the method includes the following steps:

Step 201, a first wireless access device receives a first interference indication, where the first interference indication is sent by a first terminal when the first terminal detects that neighbor cell interference caused by a second terminal to the first terminal is greater than or equal to a preset threshold, the first interference indication is used for indicating that the first terminal suffers the neighbor cell interference, and the first wireless access device and the first terminal belong to a first wireless communication system.

The neighbor cell interference caused by the second terminal to the first terminal may includes the following scenarios: since the first terminal and the second terminal are geographically close and their communication frequency bands are adjacent, the neighbor cell interference is caused. For example, when the first terminal receives downlink data and/or downlink signalling sent by the first wireless access device, if the second terminal performs uplink communication or downlink communication with a second wireless access device, uplink data and/or uplink signalling of the second terminal or downlink data and/or downlink signalling of the second terminal may cause neighbor cell interference on the downlink data and/or the downlink signalling detected by the first terminal. At this time, if the first terminal performs transmission of uplink data and/or uplink signalling, the uplink data and/or uplink signalling and the downlink data and/or downlink signalling of the second terminal may also cause neighbor cell interference on the uplink data and/or the uplink signalling of the first terminal. However, the neighbor cell interference may be detected by the first wireless access device, but since anti-interference capability of the first wireless access device is far greater than that of the first terminal, negative effect caused by the above neighbor cell interference is much less obvious than that of neighbor cell interference detected by the first terminal.

Step 202, the first wireless access device sends a decreasing interference indication to a second wireless access device corresponding to the second terminal when determining that the first terminal suffers the neighbor cell interference from the second terminal, so that the second wireless access device executes a decreasing interference strategy to eliminate neighbor cell interference between the first terminal and the second terminal, where the second wireless access device and the second terminal belong to a second wireless communication system.

The first wireless communication system is a WLAN system, and the second wireless communication system is a cellular network system; or the first wireless communication system is a cellular network system, and the second wireless communication system is a WLAN system; or the first wireless communication system is a WLAN system, and the second wireless communication system is a WLAN system; or the first wireless communication system is a cellular network system, and the second wireless communication system is a cellular network system.

The decreasing interference strategy executed by the second wireless access device includes at least one of the following strategies: instructing the second terminal to decrease uplink transmitting power of the second terminal; or decreasing downlink transmitting power of the second wireless access device; or adjusting a frequency band of an uplink of the second terminal; or adjusting a frequency band of a downlink of the second terminal. The downlink transmitting power of the second wireless access device may also be called downlink transmitting power of the downlink of the second terminal.

In the embodiment of the present disclosure, the first terminal may send interference information of the neighbor cell interference to the first wireless access device. For example, the interference information includes: frequency band information of the neighbor cell interference and interference magnitude. The first wireless access device may determine a source of the neighbor cell interference according to the interference information of the neighbor cell interference and analyze the neighbor cell interference. For example, the first wireless access device determines that a terminal causing neighbor cell interference to the first terminal is the second terminal according to frequency band information of the neighbor cell interference, received power, included ID sequence information of a wireless access device and ID sequence information of other terminals, and the like. Therefore, the first wireless access device may send the decreasing interference indication to the second wireless access device corresponding to the second terminal.

Optionally, if the decreasing interference strategy is instructing the second terminal to decrease the uplink transmitting power of the second terminal or decreasing the downlink transmitting power of the second wireless access device, after the step 202, the method further includes:

The first wireless access device receives the decreasing interference indication sent by the second wireless access device, where the decreasing interference indication is sent from the second terminal to the second wireless access device; the first wireless access device sends the decreasing interference indication to the first terminal, so that the first terminal decreases uplink transmitting power of the first terminal, or the first wireless access device decreases downlink transmitting power of the first wireless access device.

The first wireless access device may receive the decreasing interference indication sent by the second wireless access device through a backhaul, where the backhaul is a communication link between the first wireless access device and the second wireless access device. In the present embodiment, the backhaul may be established between wireless access devices in advance, so that bi-directional communication may be performed between the wireless access devices. The backhaul may include a wired medium such as an optical fiber, a coaxial cable or the like, and it may also include a wireless medium such as wireless microwave, millimeter wave or the like. As for an ideal backhaul, transmission capacity may be infinite, a transmission speed may be infinitely fast and a delay may be infinitesimal.

An embodiment of the present disclosure provides a method for eliminating inter-system neighbor cell interference. Referring to FIG. 3, it is a schematic flow diagram of method 2 for eliminating inter-system neighbor cell interference provided in the embodiment of the present disclosure. As shown in the figure, the method includes the following steps:

Step 301, a second wireless access device receives a decreasing interference indication, where the decreasing interference indication is sent by a first wireless access device when the first wireless access device receives a first interference indication sent by a first terminal and determines that the first terminal suffers neighbor cell interference from a second terminal, the first interference indication is sent by the first terminal when the first terminal detects that neighbor cell interference caused by the second terminal to the first terminal is greater than or equal to a preset threshold, the first interference indication is used for indicating that the first terminal suffers the neighbor cell interference, the first wireless access device and the first terminal belong to a first wireless communication system, and the second wireless access device and the second terminal belong to a second wireless communication system.

Step 302, the second wireless access device executes a decreasing interference strategy to eliminate neighbor cell interference between the first terminal and the second terminal.

The decreasing interference strategy executed by the second wireless access device includes at least one of the following strategies: instructing the second terminal to decrease uplink transmitting power of the second terminal; or decreasing downlink transmitting power of the second wireless access device; or adjusting a frequency band of an uplink of the second terminal; or adjusting a frequency band of a downlink of the second terminal.

Optionally, if the decreasing interference strategy is instructing the second terminal to decrease the uplink transmitting power of the second terminal and/or decreasing the downlink transmitting power of the second wireless access device, after the step 302, the method further includes: receiving, by the second wireless access device, a decreasing interference indication sent by the second terminal; sending, by the second wireless access device, the decreasing interference indication to the first wireless access device, so that the first wireless access device instructs the first terminal to decrease uplink transmitting power of the first terminal, or the first wireless access device decreases downlink transmitting power of the first wireless access device.

Optionally, if the adjusting the frequency band of the uplink of the second terminal includes increasing the frequency band of the uplink of the second terminal, or the adjusting the frequency band of the downlink of the second terminal includes increasing the frequency band of the downlink of the second terminal, and after the step 302, the method further includes:

The second wireless access device receives a decreasing interference indication sent by the second terminal; the second wireless access device sends the decreasing interference indication to a third wireless access device when determining that the second terminal suffers neighbor cell interference from a third terminal, so that the third wireless access device decreases downlink transmitting power of the third wireless access device, or the third wireless access device instructs the third terminal to decrease uplink transmitting power of the third terminal.

The first wireless communication system is a WLAN system, and the second wireless communication system is a cellular network system; or the first wireless communication system is a cellular network system, and the second wireless communication system is a WLAN system; or the first wireless communication system is a WLAN system, and the second wireless communication system is a WLAN system; or the first wireless communication system is a cellular network system, and the second wireless communication system is a cellular network system.

It should be noted that in the above-mentioned methods, if the second wireless access device increases the frequency band of the uplink of the second terminal or increases the frequency band of the downlink of the second terminal, it will result in two problems. One problem is: when the frequency band of the uplink of the second terminal is increased, attenuation of radio waves caused by increase of the frequency band may be intensified, and if the second terminal uses original uplink transmitting power, it should ensure that a target signal to interference plus noise ratio (SINR) of the uplink is unchanged, i.e., ensuring that a communication quality of the uplink is unchanged. The original uplink transmitting power will not satisfy requirements of uplink coverage, that is to say, an uplink signal of a UE can not be sent to the second wireless access device in a good quality. At this time, use of the original uplink transmitting power may result in a decline of SINR. Therefore, in order to ensure the uplink coverage, the second terminal needs to increase C/I according to a ratio relation in a same direction of the SINR and carrier/interference. A method of increasing C/I may be that the second terminal increases its own uplink transmitting power, i.e., increasing the C, and it may also be decreasing interference suffered by the second terminal, i.e., decreasing the I. However, if the second terminal increases its own uplink transmitting power, consumption of a battery life of the second terminal will be accelerated. Therefore, the uplink transmitting power of the second terminal is not increased, but an indication that the I needs to be decreased is sent to a third terminal which causes neighbor cell interference through the second wireless access device. In this way, a problem of uplink coverage caused by increase of the frequency band of the uplink of the second terminal or a problem of downlink coverage caused by increase of the frequency band of the downlink of the second terminal may be solved by decreasing uplink transmitting power of the third terminal or by decreasing downlink transmitting power of the third wireless access device, so that not only the neighbor cell interference between the first terminal and the second terminal may be eliminated, but also the uplink coverage or the downlink coverage of the second terminal may be ensured, and a battery life of the second terminal may be extended. The other problem is: since the frequency band of the uplink or the downlink of the second terminal is increased, it probably causes new neighbor cell interference between the second terminal and other terminals (e.g., the third terminal) except the first terminal, and thus the second terminal sends a decreasing interference indication to the second wireless access device, so that the third wireless access device accessed by the third terminal which causes the new neighbor cell interference to the second terminal instructs the third terminal to decrease the uplink transmitting power of the third terminal, or decreases the downlink transmitting power of the third wireless access device, thereby decreasing or eliminating the neighbor cell interference from the third terminal to the second terminal.

In the above-mentioned methods, the WLAN system may be a wireless fidelity (Wi-Fi) system.

In the present disclosure, in order to facilitate description, a concept of an uplink and a downlink in the cellular network system is referenced to define a link from an STA to an AP in the WLAN system as an uplink of the WLAN system, and to define a link from the AP to the STA in the WLAN system as a downlink.

For example, the WLAN system occupies an unauthorized frequency band ranging from 9 GHz to 10 GHz, and the cellular network system occupies an authorized frequency band ranging from 10 GHz to 11 GHz; or, the WLAN system occupies an unauthorized frequency band ranging from 24 GHz to 24.25 GHz, and the cellular network system occupies an authorized frequency band ranging from 24.25 GHz to 24.35 GHz; or, the WLAN system occupies an unauthorized frequency band ranging from 14.5 GHz to 15.35 GHz, and the cellular network system occupies an authorized frequency band ranging from 14 GHz to 14.5 GHz.

In the embodiment of the present disclosure, the neighbor cell interference includes: interference between an uplink of the first wireless communication system and an uplink of the second wireless communication system, interference between a downlink of the first wireless communication system and the uplink of the second wireless communication system, interference between the uplink of the first wireless communication system and a downlink of the second wireless communication system, and interference between the downlink of the first wireless communication system and the downlink of the second wireless communication system.

Embodiment 1

Referring to FIG. 4 and FIG. 5, they are a schematic flow diagram and a schematic diagram of interference of embodiment 1 of a method for eliminating inter-system neighbor cell interference provided in an embodiment of the present disclosure. When an STA and a UE send data and/or signalling to an AP and a BS over their respective uplink channels, the STA and the UE may cause neighbor cell interference to a downlink of the other side respectively since they are geographically close and their frequency bands are adjacent, and both the STA and the UE may detect magnitude of the neighbor cell interference caused by the other side and frequency band of the neighbor cell interference, respectively. The STA is equivalent to the first terminal described above, the AP is equivalent to the first wireless access device described above, the UE is equivalent to the second terminal described above, and the BS is equivalent to the second wireless access device described above, where the STA and the AP belong to a WLAN system, and the UE and the BS belong to a cellular network system. As shown in FIG. 4, the method includes the following steps:

Step 401, the STA detects neighbor cell interference (Neighbor-Cell Interference, NCI) suffered by itself. If it is detected that NCI caused by an uplink of the UE is greater than or equal to a preset interference threshold, the STA sends a first interference indication to the AP for indicating that the STA suffers neighbor cell interference, where the first interference indication may include detected NCI.

The neighbor cell interference refers to interference caused by that power of an adjacent frequency channel of an interference station falls into a passband of a receiver for receiving the adjacent frequency channel. Both cases that a channel adjacent to a working channel of a local cell exists in a neighbor cell due to frequency planning, or a coverage area of a BS is larger than an area required in design due to certain reason will cause neighbor cell interference. When carrier-to-interference ratio (Carrier/Interference, C/I) of the neighbor cell interference is less than a specific threshold, it will affect a communication quality of a mobile phone directly, and even will cause a drop call or the mobile phone failing to establish a normal call.

Step 402, the AP receives the first interference indication sent by the STA and sends a decreasing interference indication to the BS by a manner of a backhaul for instructing to decrease the interference caused by the UE, where the decreasing interference indication includes a quantized value of NCI.

Step 403, the BS receives the decreasing interference indication sent by the AP, obtains a value of uplink transmitting power that needs to be decreased by the UE according to the included quantized value of NCI, and sends a decreasing power indication to the UE through a downlink, where the decreasing power indication includes the value of the uplink transmitting power that needs to be decreased by the UE.

Step 404, the UE receives the decreasing power indication sent by the BS, where the decreasing power indication is used for instructing to decrease the uplink transmitting power of the UE, and the UE decreases its own uplink transmitting power according to the included value of the uplink transmitting power that needs to be decreased, so as to decrease or eliminate neighbor cell interference between the UE and the STA.

Then, the UE may compute its own C/I, where the C may be expressed as the uplink transmitting power of the UE in principle and the I denotes the neighbor cell interference suffered by the UE, i.e., the I may be expressed as magnitude of the neighbor cell interference caused by uplink transmitting power of the STA; the UE obtains that a signal to interference plus noise ratio (SINR) of an uplink is unchanged according to the C/I. In order to keep the SINR unchanged, according to the C/I of the UE, if the C is decreased, the I needs to be decreased, i.e., the UE requires the STA to decrease the uplink transmitting power of the STA. Thus, the UE sends a decreasing interference indication to the BS.

Step 405, the BS sends the decreasing interference indication to the AP by a manner of a backhaul for instructing to decrease the interference caused by the STA, for example, decreasing the uplink transmitting power of the STA, where the decreasing interference indication includes a value of uplink transmitting power that needs to be decreased by the STA.

Step 406, the AP receives the decreasing interference indication sent by the BS and sends a decreasing power indication to the STA, where the decreasing power indication includes the value of the uplink transmitting power that needs to be decreased by the STA.

Step 407, the STA receives the decreasing power indication sent by the AP and decreases its own uplink transmitting power according to the included value on a premise that a target SINR of its own uplink is unchanged.

Further, the STA may continue to detect NCI suffered by itself. If it is detected that the NCI it suffers is greater than or equal to a preset interference threshold, step 401 is executed; if it is detected that the NCI it suffers is less than the preset interference threshold, it indicates that the NCI has been suppressed within a required range and the procedure ends.

As shown in FIG. 5, it should be noted that, although the neighbor cell interference suffered by the STA is caused by the uplink of the UE and the neighbor cell interference suffered by the UE is caused by the uplink of the STA similarly in the present embodiment, there is no denying that the UE will cause interference to the data and/or signalling of the downlink from the AP to the STA when receiving data and/or signalling of the downlink. Accordingly, the STA will cause interference to the data and/or signalling of the downlink from the BS to the UE when receiving data and/or signalling of the downlink. In such a scenario, the method for eliminating neighbor cell interference employed in the present embodiment is still applicable. In addition, in the present embodiment, as shown in FIG. 5, the AP and the BS are in different geographical positions, but a case that the AP and the BS are in a same geographical position is also included in the present disclosure, i.e., a scenario of sharing a station site. At this time, transmission effect of a backhaul will be better and more close to an ideal condition. Further, a scenario that even two or a plurality of wireless communication systems share a station site also exists, and if frequency bands of the two or the plurality of wireless communication systems are configured to be adjacent, co-channel interference will still be caused, and the method for eliminating interference described in the embodiment of the present disclosure is still applicable, and will not be repeated redundantly herein.

Embodiment 2

Figure 6:
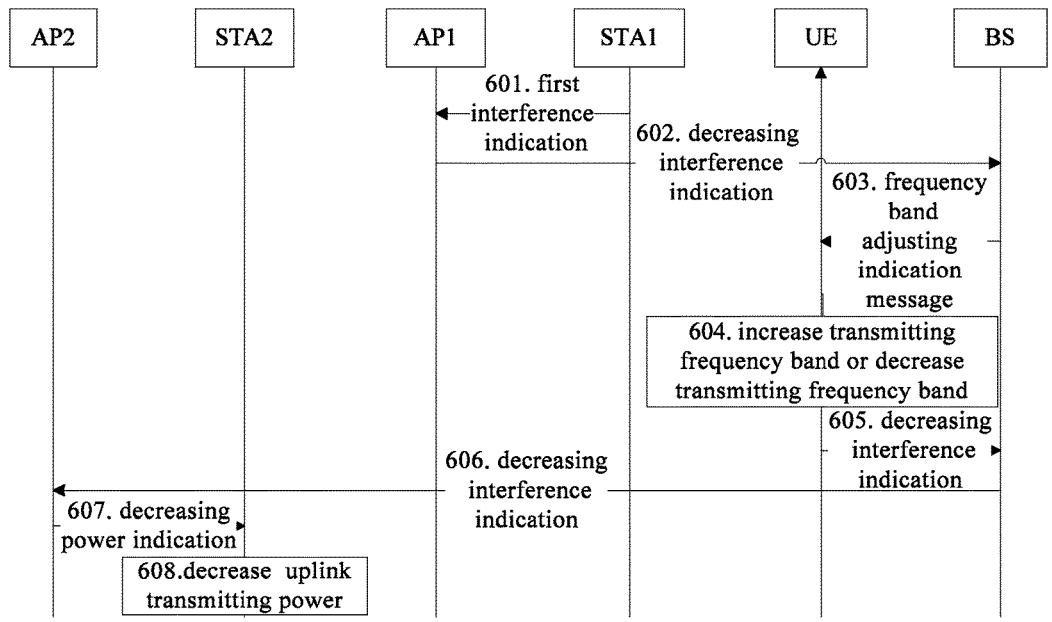
FIG. 6 is a schematic flow diagram of embodiment 2 of a method for eliminating inter-system neighbor cell interference provided in an embodiment of the present disclosure.
Figure 7:
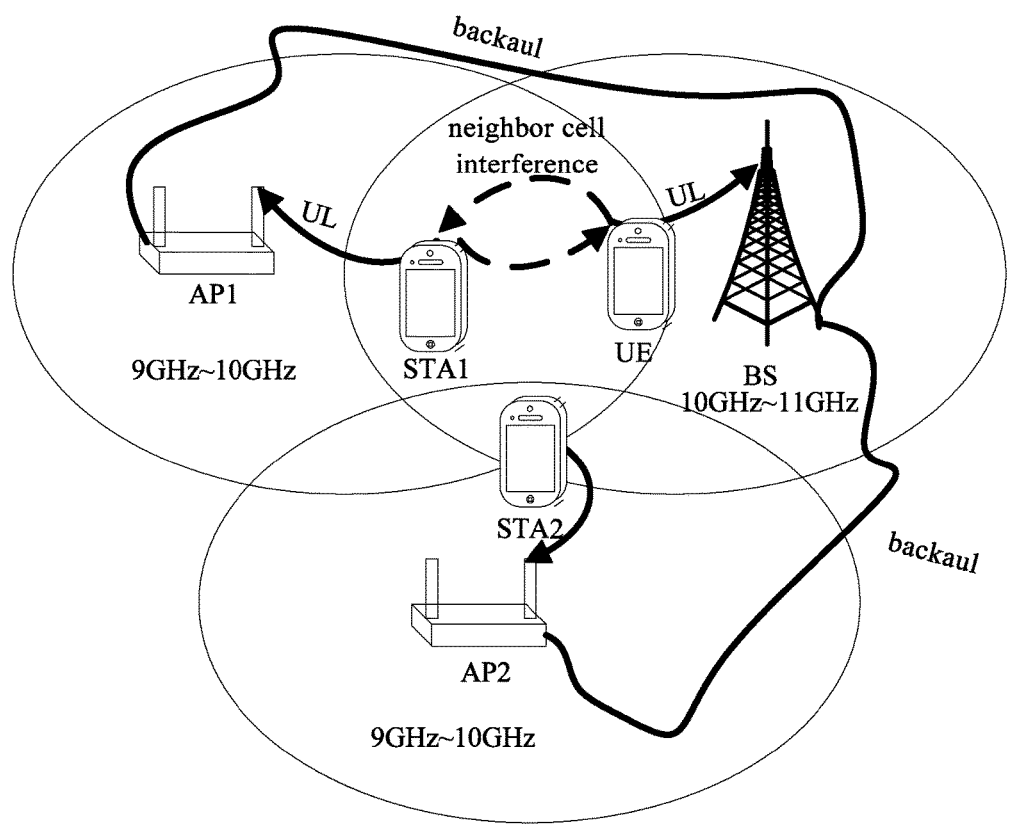
FIG. 7 is a schematic diagram of interference of embodiment 2 of a method for eliminating inter-system neighbor cell interference provided in an embodiment of the present disclosure.

Referring to FIG. 6 and FIG. 7, they are a schematic flow diagram and a schematic diagram of interference of embodiment 2 of a method for eliminating inter-system neighbor cell interference provided in an embodiment of the present disclosure, respectively. When STA1 and a UE send data and/or signalling to AP1 and a BS over their respective uplink channels, STA1 and the UE will cause neighbor cell interference to a downlink of the other side respectively since they are geographically close and their frequency bands are adjacent, and both STA1 and the UE may detect magnitude of the neighbor cell interference caused by the other side and their frequency bands, respectively. As shown in FIG. 7, FIG. 7 merely shows a scenario that STA1 is an interference source and UE is an interference source. In fact, a downlink from the BS to the UE will also cause neighbor cell interference to a downlink from AP1 to STA1, and such kind of neighbor cell interference may be detected by STA1. Similarly, the downlink from AP1 to STA1 will actually cause neighbor cell interference to the downlink from the BS to the UE, and such kind of neighbor cell interference may be detected by the UE. STA1 is equivalent to the first terminal described above, AP1 is equivalent to the first wireless access device described above, the UE is equivalent to the second terminal described above, and the BS is equivalent to the second wireless access device described above, where STA1 and AP1 belong to a first WLAN system, STA2 and AP2 belong to a second WLAN system, and the UE and the BS belong to a cellular network system. As shown in FIG. 6, the method includes the following steps:

Step 601, STA1 detects NCI suffered by itself. If it is detected that NCI caused by the UE is greater than or equal to a preset interference threshold, STA1 sends a first interference indication to AP1 for indicating that the STA suffers neighbor cell interference, where the first interference indication may include detected NCI.

Step 602, AP1 receives the first interference indication sent by STA1 and sends a decreasing interference indication to the BS by a manner of a backhaul for instructing to decrease uplink transmitting power of the UE, where the decreasing interference indication includes NCI.

Step 603, the BS receives the decreasing interference indication sent by AP1 and obtains a value of uplink transmitting power that needs to be decreased by the UE according to the included NCI. The BS finds that if the UE decreases the uplink transmitting power according to the value of the uplink transmitting power that needs to be decreased by the UE, it will result in that C/I of the UE is less than a specific threshold. Therefore, in order to ensure a communication quality of a mobile phone, the BS determines not to decrease the uplink transmitting power of the UE, but to adjust a transmitting frequency band of the UE according to a preset decreasing interference strategy. The UE is transferred to a frequency band which is not adjacent to a transmitting frequency band of STA1, for example, increasing the transmitting frequency band of the UE, to eliminate neighbor cell interference between the UE and STA1. Thus, the BS sends a frequency band adjusting indication message to the UE.

Step 604, the UE increases its transmitting frequency band or decreases its transmitting frequency band according to the frequency band adjusting indication message. In this way, it will cause new neighbor cell interference between the cellular network system and a second WLAN system including STA2 and AP2.

Step 605, if the UE is transferred to a transmitting frequency band which is higher than an original transmitting frequency band, the UE needs to increase its C/I in order to ensure uplink coverage. Since an increase of the C by the UE will result in that power consumption of the UE is increased and a battery service life of the UE is reduced, the UE determines to decrease the I, i.e., decreasing uplink interference of STA2, for example, decreasing uplink transmitting power of STA2. Thus, the UE sends a decreasing interference indication to the BS, and decreasing power indication may include a value of uplink transmitting power that needs to be decreased by STA2.

Step 606, the BS sends the decreasing interference indication to AP2 by a manner of a backhaul for instructing to decrease the uplink transmitting power of STA2, where the decreasing power indication includes the value of the uplink transmitting power that needs to be decreased by STA2.

Step 607, AP2 receives the decreasing interference indication sent by the BS and sends a decreasing power indication to STA2, where the decreasing power indication includes the value of the uplink transmitting power that needs to be decreased by STA2.

Step 608, STA2 receives the decreasing power indication sent by AP2 and decreases its own uplink transmitting power according to the included value to ensure its own SINR is unchanged.

Embodiment 3

Figure 8:
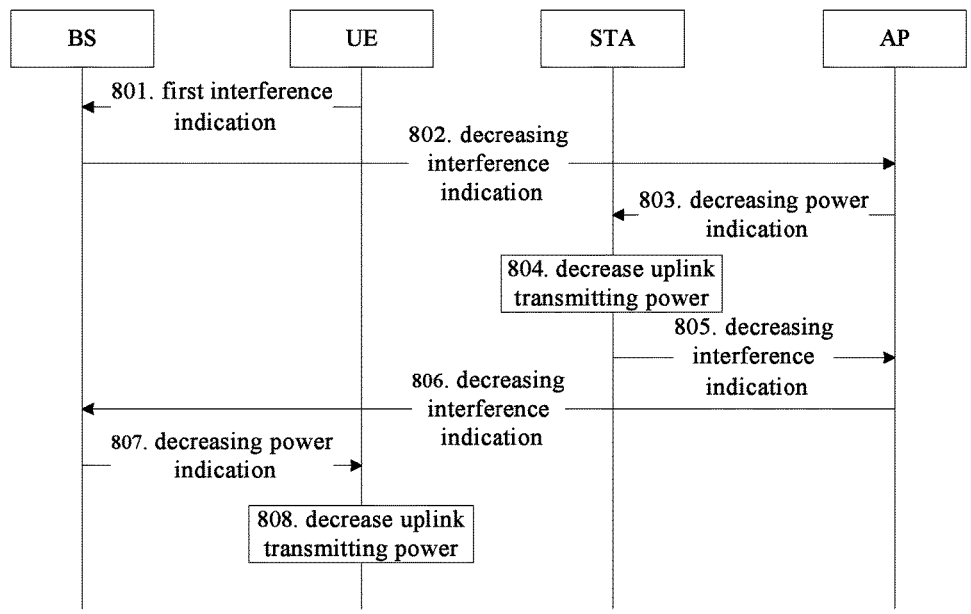
FIG. 8 is a schematic flow diagram of embodiment 3 of a method for eliminating inter-system neighbor cell interference provided in an embodiment of the present disclosure.

Referring to FIG. 8, it is a schematic flow diagram of embodiment 3 of a method for eliminating inter-system neighbor cell interference provided in an embodiment of the present disclosure. Also referring to FIG. 5, when an STA and a UE send data and/or signalling to an AP and a BS over their respective uplink channels, interference between uplinks will be caused. The UE is equivalent to the first terminal described above, the BS is equivalent to the first wireless access device described above, the STA is equivalent to the second terminal described above, and the AP is equivalent to the second wireless access device described above, where the STA and the AP belong to a WLAN system and the UE and the BS belong to a cellular network system. As shown in FIG. 8, the method includes the following steps:

Step 801, the UE detects NCI suffered by itself. If it is detected that NCI caused by the STA is greater than or equal to a preset interference threshold, the UE sends a first interference indication to the BS for indicating that the UE suffers neighbor cell interference, where the first interference indication may include detected NCI.

Step 802, the BS receives the first interference indication sent by the UE and sends a decreasing interference indication to the AP by a manner of a backhaul for instructing to decrease uplink transmitting power of the STA, where the decreasing interference indication includes NCI.

Step 803, the AP receives the decreasing interference indication sent by the BS, obtains a value of uplink transmitting power that needs to be decreased by the STA according to the included NCI, and sends a decreasing power indication to the STA through a downlink, where the decreasing power indication includes a value of the uplink transmitting power that needs to be decreased by the STA.

Step 804, the STA receives the decreasing power indication sent by the AP, and decreases its own uplink transmitting power according to the included value of the uplink transmitting power that needs to be decreased, so as to decrease or eliminate neighbor cell interference between the STA and the UE.

Step 805, the STA computes its own C/I, where the C denotes the uplink transmitting power of the STA and the I denotes neighbor cell interference suffered by the STA, i.e., the I equals to the uplink transmitting power of the UE; the STA obtains SINR of an uplink according to the C/I. In order to keep the SINR unchanged, as for the C/I of the STA, the I needs to be decreased, i.e., the uplink transmitting power of the UE needs to be decreased. Thus, the STA sends a decreasing interference indication to the AP, where the decreasing interference indication includes a value of uplink transmitting power that needs to be decreased by the UE.

Step 806, the AP sends the decreasing interference indication to the BS by a manner of a backhaul for instructing to decrease the uplink transmitting power of the UE, where the decreasing interference indication includes the value of the uplink transmitting power that needs to be decreased by the UE.

Step 807, the BS receives the decreasing interference indication sent by the AP and sends a decreasing power indication to the UE, where the decreasing power indication includes the value of the uplink transmitting power that needs to be decreased by the UE.

Step 808, the UE receives the decreasing power indication sent by the BS and decreases its own uplink transmitting power according to the included value to ensure its own SINR is unchanged.

Step 809, the UE detects NCI suffered by itself. If it is detected that the NCI it suffers is greater than or equal to a preset interference threshold, step 801 is executed; if it is detected that the NCI it suffers is less than the preset interference threshold, it indicates that the NCI has been suppressed within a required range and the procedure ends.

Embodiment 4

Figure 9:
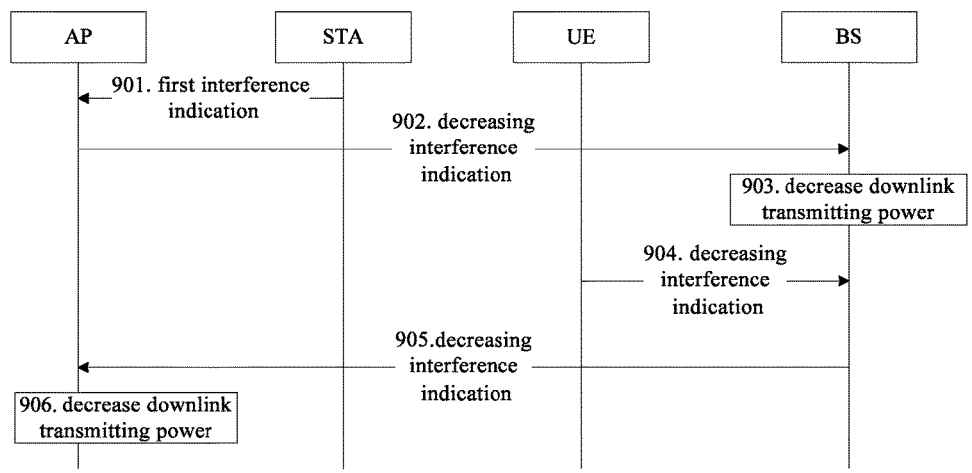
FIG. 9 is a schematic flow diagram of embodiment 4 of a method for eliminating inter-system neighbor cell interference provided in an embodiment of the present disclosure.
Figure 10:
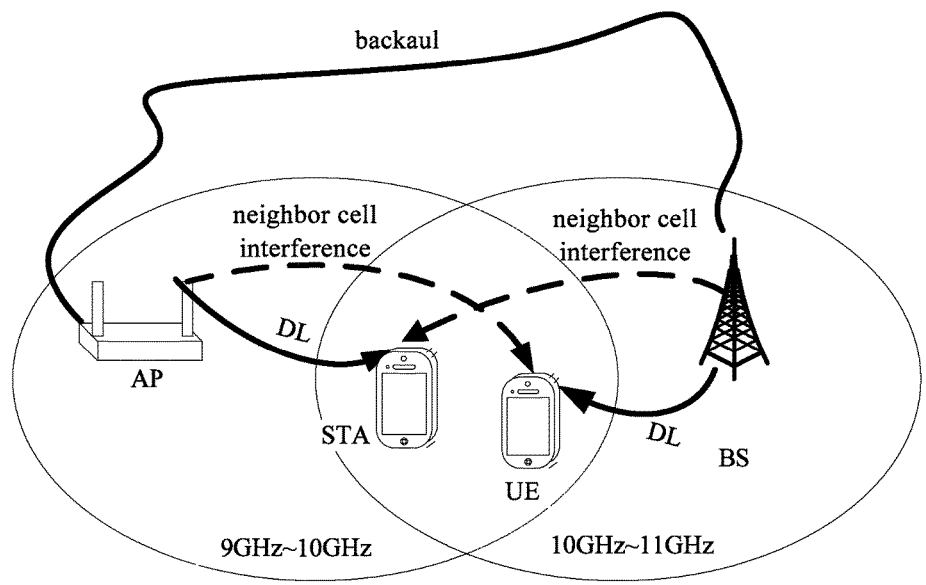
FIG. 10 is a schematic diagram of interference of embodiment 4 of a method for eliminating inter-system neighbor cell interference provided in an embodiment of the present disclosure.

Referring to FIG. 9 and FIG. 10, they are a schematic flow diagram and a schematic diagram of interference of embodiment 4 of a method for eliminating inter-system neighbor cell interference provided in an embodiment of the present disclosure, respectively. When an AP and a BS send data and/or signalling to an STA and a UE over their respective downlink channels, interference between downlinks will be caused. The STA is equivalent to the first terminal described above, the AP is equivalent to the first wireless access device described above, the UE is equivalent to the second terminal described above, and the BS is equivalent to the second wireless access device described above, where the STA and the AP belong to a WLAN system and the UE and the BS belong to a cellular network system. As shown in FIG. 9, the method includes the following steps:

Step 901, the STA detects NCI suffered by itself. If it is detected that NCI caused by the UE is greater than or equal to a preset interference threshold, the STA sends a first interference indication to the AP for indicating that the STA suffers neighbor cell interference, where the first interference indication may include detected NCI.

Step 902, the AP receives the first interference indication sent by the STA and sends a decreasing interference indication to the BS by a manner of a backhaul for instructing to decrease downlink transmitting power of a downlink of the UE, where the decreasing interference indication includes NCI.

Step 903, the BS receives the decreasing interference indication sent by the AP, obtains a value of downlink transmitting power that needs to be decreased of the UE according to the included NCI, and decreases the downlink transmitting power of the downlink of the UE according to the value.

Step 904, after the BS decreases the downlink transmitting power, the UE computes its own C/I, where the C denotes the downlink transmitting power of the UE and the I denotes neighbor cell interference suffered by the UE, i.e., the I equals to downlink transmitting power of a downlink of the STA; since the BS decreases the downlink transmitting power of the downlink of the UE, the UE finds that the C becomes smaller. In order to keep SINR of the downlink unchanged, the UE expects to decrease the I, i.e., it needs to decrease the downlink transmitting power of the downlink of the STA. Thus, the UE sends a decreasing interference indication to the BS, where the decreasing interference indication includes a value of downlink transmitting power that needs to be decreased of the STA.

Step 905, the BS sends the decreasing interference indication to the AP by a manner of a backhaul for instructing to decrease the downlink transmitting power of the downlink of the STA, where the decreasing interference indication includes the value of the downlink transmitting power that needs to be decreased of the STA.

Step 906, the AP receives the decreasing power indication sent by the BS and decreases the downlink transmitting power of the downlink of the STA to eliminate neighbor cell interference between the STA and the UE.

Embodiment 5

Figure 11:
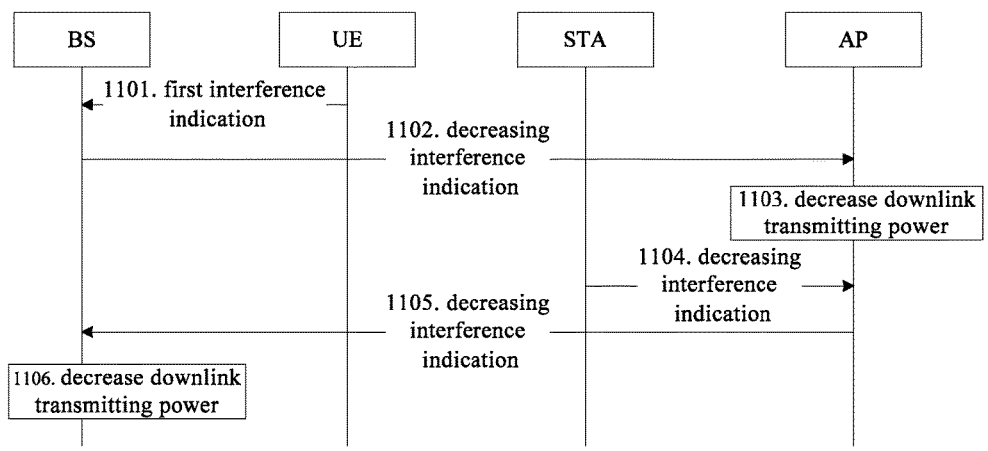
FIG. 11 is a schematic flow diagram of embodiment 5 of a method for eliminating inter-system neighbor cell interference provided in an embodiment of the present disclosure.

Referring to FIG. 11, it is a schematic flow diagram of embodiment 5 of a method for eliminating inter-system neighbor cell interference provided in an embodiment of the present disclosure. Also referring to FIG. 10, when an AP and a BS send data and/or signalling to an STA and a UE over their respective downlink channels, interference between downlinks will be caused. The UE is equivalent to the first terminal described above, the BS is equivalent to the first wireless access device described above, the STA is equivalent to the second terminal described above, and the AP is equivalent to the second wireless access device described above, where the STA and the AP belong to a WLAN system and the UE and the BS belong to a cellular network system. As shown in FIG. 11, the method includes the following steps:

Step 1101, the UE detects NCI suffered by itself. If it is detected that NCI caused by the STA is greater than or equal to a preset interference threshold, the UE sends a first interference indication to the BS for indicating that the UE suffers neighbor cell interference, where the first interference indication may include detected NCI.

Step 1102, the BS receives the first interference indication sent by the UE and sends a decreasing interference indication to the AP by a manner of a backhaul for instructing to decrease downlink transmitting power of a downlink of the STA, where the decreasing interference indication includes NCI.

Step 1103, the AP receives the decreasing interference indication sent by the BS, obtains a value of downlink transmitting power that needs to be decreased of the downlink of the STA according to the included NCI, and decreases the downlink transmitting power of the downlink of the STA according to the value.

Step 1104, after the AP decreases the downlink transmitting power, the STA computes its own C/I, where the C denotes the downlink transmitting power of the downlink of the STA and the I denotes neighbor cell interference suffered by the STA, i.e., the I equals to downlink transmitting power of a downlink of the UE; since the AP decreases the downlink transmitting power of the downlink of the STA, the STA finds that the C becomes smaller. In order to keep SINR of the downlink unchanged, the STA expects to decrease the I, i.e., it needs to decrease the downlink transmitting power of the downlink of the UE. Thus, the STA sends a decreasing interference indication to the AP, where the decreasing interference indication includes a value of downlink transmitting power that needs to be decreased of the downlink of the UE.

Step 1105, the AP sends the decreasing interference indication to the BS by a manner of a backhaul for instructing the BS to decrease the downlink transmitting power of the downlink of the UE, where the decreasing interference indication includes the value of the downlink transmitting power that needs to be decreased of the downlink of the UE.

Step 1106, the BS receives the decreasing interference indication sent by the AP and decreases the downlink transmitting power of the downlink of the UE.

Figure 12:
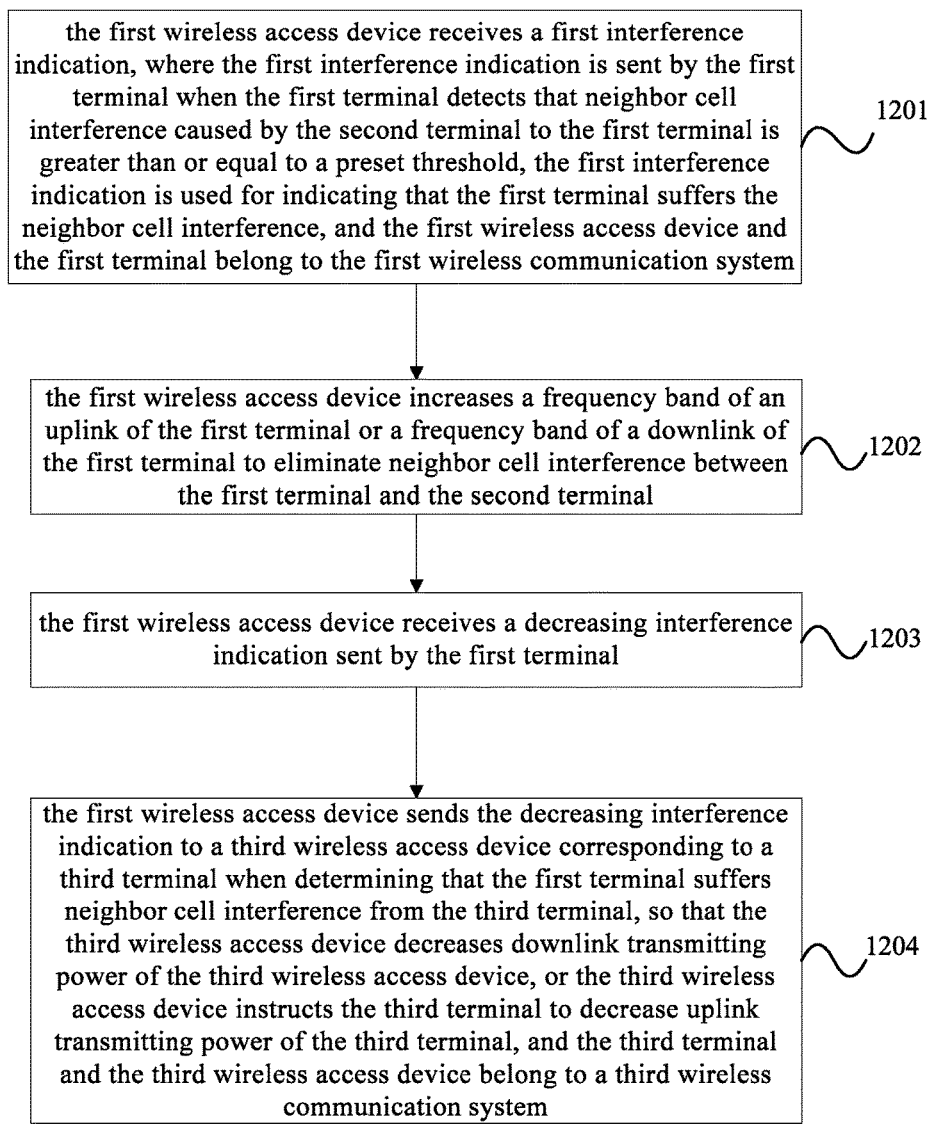
FIG. 12 is a schematic flow diagram of method 3 for eliminating inter-system neighbor cell interference provided in an embodiment of the present disclosure.

An embodiment of the present disclosure provides a method for eliminating inter-system neighbor cell interference. Referring to FIG. 12, it is a schematic flow diagram of method 3 for eliminating inter-system neighbor cell interference provided in the embodiment of the present disclosure. As shown in FIG. 12, systems include a WLAN system and a cellular network system; systems include a first wireless communication system and a second wireless communication system; the first wireless communication system includes a first terminal and a first wireless access device; and the second wireless communication system includes a second terminal and a second wireless access device. The method includes the following steps:

Step 1201, the first wireless access device receives a first interference indication, where the first interference indication is sent by the first terminal when the first terminal detects that neighbor cell interference caused by the second terminal to the first terminal is greater than or equal to a preset threshold, the first interference indication is used for indicating that the first terminal suffers the neighbor cell interference, and the first wireless access device and the first terminal belong to the first wireless communication system.

Step 1202, the first wireless access device increases a frequency band of an uplink of the first terminal or a frequency band of a downlink of the first terminal to eliminate neighbor cell interference between the first terminal and the second terminal.

Step 1203, the first wireless access device receives a decreasing interference indication sent by the first terminal.

Step 1204, the first wireless access device sends the decreasing interference indication to a third wireless access device corresponding to a third terminal when determining that the first terminal suffers neighbor cell interference from the third terminal, so that the third wireless access device decreases downlink transmitting power of the third wireless access device, or the third wireless access device instructs the third terminal to decrease uplink transmitting power of the third terminal, and the third terminal and the third wireless access device belong to a third wireless communication system.

In the above embodiment, optionally, when the first wireless access device increases a frequency band of an uplink of the first terminal or a frequency band of a downlink of the first terminal, the third terminal causes neighbor cell interference to the first terminal.

The first wireless access device may send a decreasing interference indication to the third wireless access device through a backhaul.

It should be noted that in the above-mentioned methods, if the first wireless access device increases a transmitting frequency band of the first terminal, it will result in two problems. One problem is: when the transmitting frequency band of the first terminal is increased, if the first terminal uses an original uplink transmitting power, it will not satisfy requirements of uplink coverage, that is to say, an uplink signal of the first terminal can not be sent to the first wireless access device. Therefore, in order to ensure the uplink coverage, the first terminal needs to increase C/I. A method of increasing C/I may be that the first terminal increases its own uplink transmitting power, i.e., increasing the C, and it may also be decreasing interference suffered by the first terminal, i.e., decreasing the I. However, if the first terminal increases its own uplink transmitting power, consumption of a battery life of the first terminal will be accelerated. Therefore, the uplink transmitting power of the first terminal is not increased, but an indication that the I needs to be decreased is sent to a third terminal which causes neighbor cell interference through the first wireless access device. In this way, problem of uplink coverage caused by increase of the transmitting frequency band of the first terminal may be solved by decreasing uplink transmitting power or downlink transmitting power of a downlink of the third terminal, so that not only the neighbor cell interference between the first terminal and the second terminal may be eliminated, but also the uplink coverage of the first terminal and battery life of the first terminal may be ensured. The other problem is: since the transmitting frequency band of the first terminal is increased, it will probably cause new neighbor cell interference between the first terminal and other terminals (e.g., the third terminal) except the first terminal, and thus the first terminal sends a decreasing interference indication to the first wireless access device, so that the third wireless access device accessed by the third terminal which causes the new neighbor cell interference to the first terminal instructs the third terminal to decrease the uplink transmitting power, or to decrease the downlink transmitting power of the downlink of third terminal, thereby decreasing or eliminating the neighbor cell interference of the third terminal to the first terminal.

Embodiment 6

Figure 13:
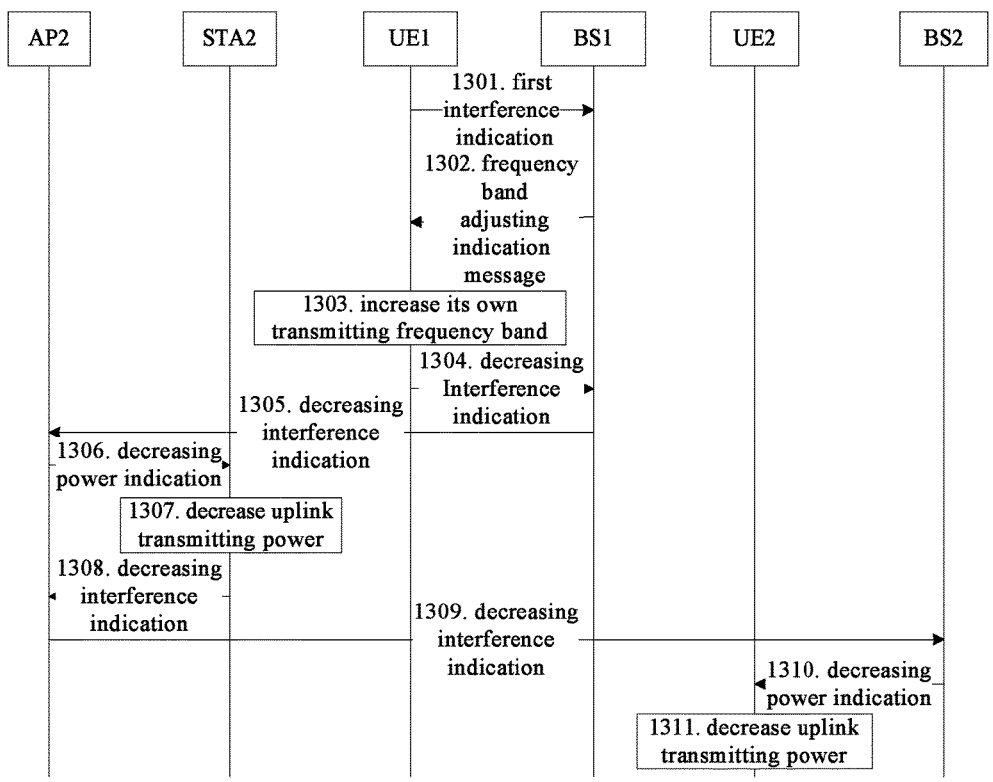
FIG. 13 is a schematic flow diagram of embodiment 6 of a method for eliminating inter-system neighbor cell interference provided in an embodiment of the present disclosure.

Referring to FIG. 13, it is a schematic flow diagram of embodiment 6 of a method for eliminating inter-system neighbor cell interference provided in an embodiment of the present disclosure. Also referring to FIG. 7, when STA1 and UE1 send data and/or signaling to AP1 and a BS over their respective uplink channels, interference between uplinks will be caused. BS1 transfers a transmitting frequency band of UE to a frequency band which is not adjacent to a transmitting frequency band of STA1 to eliminate neighbor cell interference between UE1 and STA1. However, after transferring, a cellular network system will cause interference to a WLAN system including STA2 and AP2. UE1 is equivalent to the first terminal described above, BS1 is equivalent to the first wireless access device described above, STA1 is equivalent to the second terminal described above, AP1 is equivalent to the second wireless access device described above, STA2 is equivalent to the third terminal described above, and AP2 is equivalent to the third wireless access device described above. As shown in FIG. 13, the method includes the following steps:

Step 1301, UE1 detects NCI suffered by itself. If it is detected that NCI caused by STA1 is greater than or equal to a preset interference threshold, UE1 sends a first interference indication to BS1 through an uplink for indicating that UE1 suffers neighbor cell interference, where the first interference indication may include detected NCI.

Step 1302, BS1 receives the first interference indication sent by UE1 and obtains a value of uplink transmitting power that needs to be decreased by UE1 according to the included NCI. BS1 finds that if UE1 decreases the uplink transmitting power according to the value of the uplink transmitting power that needs to be decreased by UE1, it will result in that C/I of UE1 is less than a specific threshold. Therefore, in order to ensure a communication quality of a mobile phone, BS1 determines not to decrease the uplink transmitting power of UE1 according to a preset strategy, but to increase a transmitting frequency band of UE1. Therefore, BS1 sends a frequency band adjusting indication message to UE1, so that UE1 transfers its own transmitting frequency band to a frequency band which is not adjacent to a transmitting frequency band of STA1 to eliminate neighbor cell interference between UE1 and STA1. After transferring, the cellular network system will cause interference to the WLAN system including STA2 and AP2.

Step 1303, UE1 transfers its own transmitting frequency band to a transmitting frequency band which is higher than an original transmitting frequency band according to the frequency band adjusting indication message, i.e., increasing its own transmitting frequency band.

Step 1304, when UE1 is transferred to a transmitting frequency band which is higher than the original transmitting frequency band, UE1 needs to increase its C/I in order to ensure uplink coverage. If UE1 increases the C, i.e., UE1 increases its own uplink transmitting power, it will result in that power consumption of UE1 is increased and a battery service life of UE1 is reduced. Therefore, UE1 determines to decrease the I, i.e., decreasing uplink transmitting power of STA2. Thus, UE sends a decreasing interference indication to BS1, and the decreasing interference indication includes a value of uplink transmitting power that needs to be decreased by STA2.

Step 1304, BS1 sends the decreasing interference indication to AP2 by a manner of a backhaul for instructing to decrease the uplink transmitting power of STA2, where the decreasing interference indication includes the value of the uplink transmitting power that needs to be decreased by STA2.

Step 1305, AP2 receives the decreasing interference indication sent by BS1 and sends a decreasing power indication to STA2, where the decreasing power indication includes the value of the uplink transmitting power that needs to be decreased by STA2.

Step 1306, STA2 receives the decreasing power indication sent by AP2 and decreases its own uplink transmitting power according to the included value of the uplink transmitting power that needs to be decreased. STA2 computes its own C/I, where the C denotes the uplink transmitting power of STA2 and the I denotes neighbor cell interference suffered by STA2, i.e., the I equals to the uplink transmitting power of UE2; STA2 obtains SINR of an uplink according to the C/I. In order to keep the SINR unchanged, as for the C/I of STA2, the I needs to be decreased. Since neighbor cell interference exists between STA2 and UE2, UE2 needs to decrease its own uplink transmitting power. Thus, STA2 sends a decreasing interference indication to AP2, where the decreasing interference indication includes a value of uplink transmitting power that needs to be decreased by UE2.

Step 1307, AP2 sends the decreasing interference indication to BS2 by a manner of a backhaul for instructing to decrease the uplink transmitting power of UE2, where the decreasing interference indication includes the value of the uplink transmitting power that needs to be decreased by UE2.

Step 1308, BS2 receives the decreasing interference indication sent by AP2 and sends a decreasing power indication to UE2, where the decreasing power indication includes the value of the uplink transmitting power that needs to be decreased by UE2.

Step 1309, UE2 receives the decreasing power indication sent by BS2 and decreases its own uplink transmitting power according to the included value.

For example, a BS may perform uplink resource scheduling on a UE, allocate a frequency resource block required for uplink transmission of the UE, and then send uplink granting indication information to the UE through a downlink signalling. When the UE receives the uplink granting indication information, it knows the frequency resource block required for its uplink transmission. If the UE finds that a transmitting frequency band of the frequency resource block to be used is higher than an original transmitting frequency band, use of original transmitting power will not satisfy uplink coverage, i.e., an uplink signal of the UE will fail to be sent to the BS. In order to satisfy the uplink coverage, the UE should increase uplink transmitting power in a case of ensuring that SINR is unchanged, but it will accelerate consumption of a battery life of the UE. Therefore, the UE will not increase the uplink transmitting power, but decrease neighbor cell interference, and send neighbor cell interference expected to be decreased to the BS, enabling the BS to instruct an STA under an AP to decrease uplink transmitting power through the AP.

In the present disclosure, the proposed method for eliminating NCI applies to interference between two wireless communication systems, there is no limit to that the interference is between a cellular network system and a WLAN system, and thus the method for eliminating NCI is universal. Moreover, the WLAN system per se does not define downlink (DL) or uplink (UL), but for convenience of description in the present disclosure, the WLAN system also employs a concept of uplink and downlink as that in the cellular network system. In addition, it should be particularly noted that, FIG. 1 shows four types of neighbor cell interference, but actually deployment of multiple systems is complex and interference among systems is also varied. The present disclosure neither excludes a situation that an uplink between a first terminal and a first wireless access device causes interference to a downlink between a second terminal and a second wireless access device, nor excludes a situation that a downlink between the first terminal and the first wireless access device causes interference to an uplink between the second terminal and the second wireless access device. No matter what type of neighbor cell interference, the method for eliminating interference proposed in the embodiments of the present disclosure is universally applicable.

As shown in FIG. 1, the embodiments of the present disclosure merely illustrate a scenario that two wireless communication systems are non-co-located, however, in practical application, at least two wireless communication systems may also probably be in a same location, i.e., the at least two wireless communication systems are co-located, for example, the first wireless access device may be co-located with the second wireless access device. The above-mentioned method for eliminating or decreasing interference provided in the embodiments of the present disclosure is also applicable, which will not be repeated redundantly herein.

Embodiments of the present disclosure further provide device embodiments for implementing steps and methods in the above-mentioned method embodiments.

Figure 14:
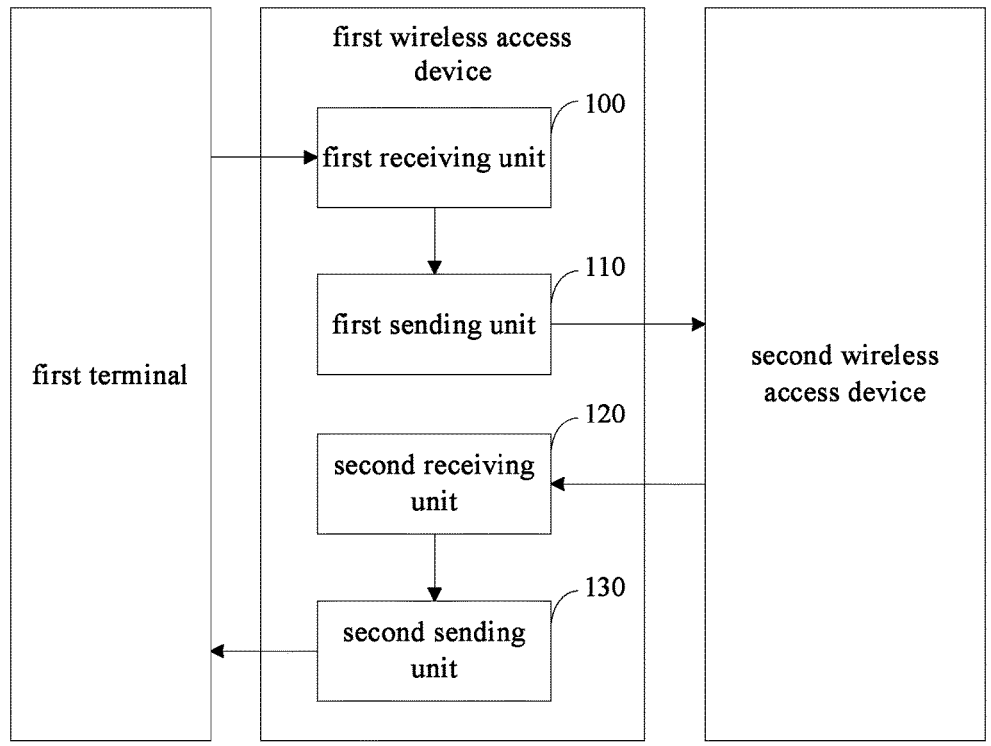
FIG. 14 is a functional block diagram of device 1 for eliminating inter-system neighbor cell interference provided in an embodiment of the present disclosure.

Referring to FIG. 14, it is a functional block diagram of device 1 for eliminating inter-system neighbor cell interference provided in an embodiment of the present disclosure. Corresponding to the elimination method shown in FIG. 2, the device is a first wireless access device, as shown in the figure, the device includes:

a first receiving unit 100, configured to receive a first interference indication, where the first interference indication is sent by a first terminal when the first terminal detects that neighbor cell interference caused by a second terminal to the first terminal is greater than or equal to a preset threshold, the first interference indication is used for indicating that the first terminal suffers the neighbor cell interference, and the first wireless access device and the first terminal belong to a first wireless communication system;

a first sending unit 110, configured to send a decreasing interference indication to a second wireless access device corresponding to the second terminal when determining that the first terminal suffers the neighbor cell interference from the second terminal, so that the second wireless access device executes a decreasing interference strategy to eliminate neighbor cell interference between the first terminal and the second terminal, and the second wireless access device and the second terminal belong to a second wireless communication system.

The first wireless communication system is a WLAN system, and the second wireless communication system is a cellular network system; or the first wireless communication system is a cellular network system, and the second wireless communication system is a WLAN system; or the first wireless communication system is a WLAN system, and the second wireless communication system is a WLAN system; or the first wireless communication system is a cellular network system, and the second wireless communication system is a cellular network system.

The decreasing interference strategy includes at least one of the following strategies: instructing the second terminal to decrease uplink transmitting power of the second terminal; or decreasing downlink transmitting power of the second terminal; or adjusting a frequency band of the second terminal.

The decreasing interference strategy is instructing the second terminal to decrease the uplink transmitting power of the second terminal or decreasing the downlink transmitting power of the second terminal, and the device further includes:

a second receiving unit 120, configured to receive a decreasing interference indication sent by the second wireless access device, where the decreasing interference indication is sent from the second terminal to the second wireless access device;

a second sending unit 130, configured to send the decreasing interference indication to the first terminal, so that the first terminal decreases uplink transmitting power of the first terminal, or the device decreases downlink transmitting power of the device.

the first receiving unit 100, further configured to receive interference information of neighbor cell interference sent by the first terminal;

the first sending unit 110, further configured to determine that the first terminal suffers the neighbor cell interference from the second terminal according to the interference information of neighbor cell interference.

Figure 15:
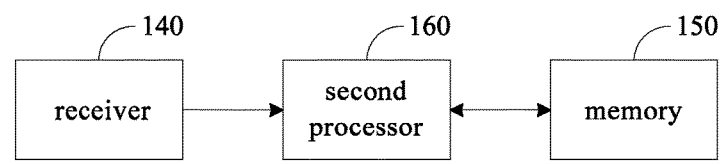
FIG. 15 is a schematic structural diagram of device 1 for eliminating inter-system neighbor cell interference provided in an embodiment of the present disclosure.

Referring to FIG. 15, it is a schematic structural diagram of device 1 for eliminating inter-system neighbor cell interference provided in an embodiment of the present disclosure. As shown in the figure, the device includes:

a receiver 140, configured to receive a first interference indication, where the first interference indication is sent by a first terminal when the first terminal detects that neighbor cell interference caused by a second terminal to the first terminal is greater than or equal to a preset threshold, the first interference indication is used for indicating that the first terminal suffers the neighbor cell interference, and the first wireless access device and the first terminal belong to a first wireless communication system;

a memory 150, configured to store information including a program;

a processor 160 coupled to the memory 150 and the receiver 140, configured to control an execution of the program, specifically including: sending a decreasing interference indication to a second wireless access device corresponding to the second terminal when determining that the first terminal suffers the neighbor cell interference from the second terminal, so that the second wireless access device executes a decreasing interference strategy to eliminate neighbor cell interference between the first terminal and the second terminal, and the second wireless access device and the second terminal belong to a second wireless communication system.

Figure 16:
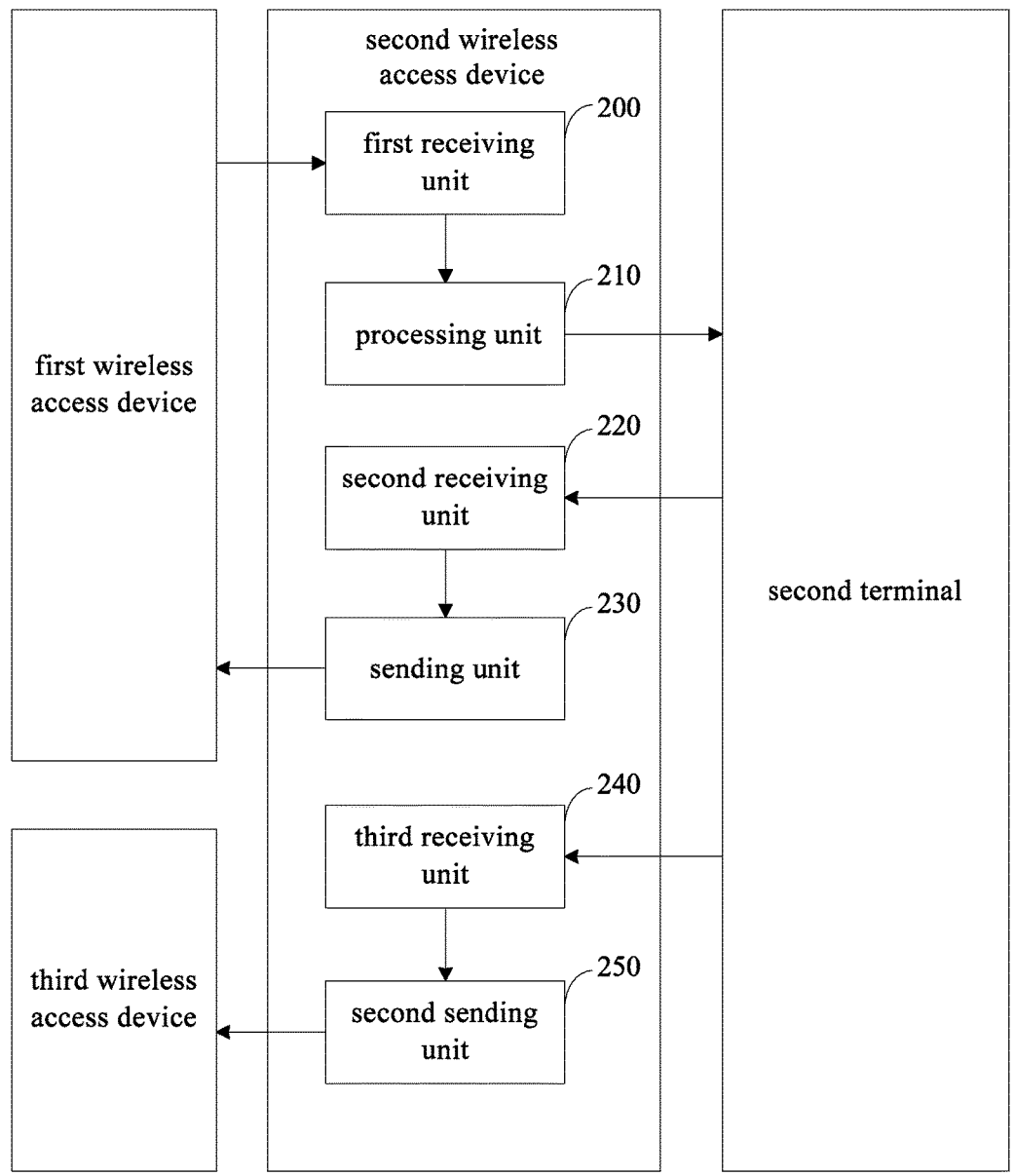
FIG. 16 is a functional block diagram of device 2 for eliminating inter-system neighbor cell interference provided in an embodiment of the present disclosure.

Referring to FIG. 16, it is a functional block diagram of device 2 for eliminating inter-system neighbor cell interference provided in an embodiment of the present disclosure. Corresponding to the elimination method shown in FIG. 3, as shown in the figure, the device includes:

a first receiving unit 200, configured to receive a decreasing interference indication, where the decreasing interference indication is sent by a first wireless access device when the first wireless access device receives a first interference indication sent by a first terminal and determines that the first terminal suffers neighbor cell interference from a second terminal, the first interference indication is sent by the first terminal when the first terminal detects that neighbor cell interference caused by the second terminal to the first terminal is greater than or equal to a preset threshold, the first interference indication is used for indicating that the first terminal suffers the neighbor cell interference, the first wireless access device and the first terminal belong to a first wireless communication system, and the second wireless access device and the second terminal belong to a second wireless communication system;

a processing unit 210, configured to execute a decreasing interference strategy to eliminate neighbor cell interference between the first terminal and the second terminal.

The first wireless communication system is a WLAN system, and the second wireless communication system is a cellular network system; or the first wireless communication system is a cellular network system, and the second wireless communication system is a WLAN system; or the first wireless communication system is a WLAN system, and the second wireless communication system is a WLAN system; or the first wireless communication system is a cellular network system, and the second wireless communication system is a cellular network system.

The decreasing interference strategy includes at least one of the following strategies: instructing the second terminal to decrease uplink transmitting power of the second terminal; or decreasing downlink transmitting power of the second terminal; or adjusting a transmitting frequency band of the second terminal.

The decreasing interference strategy is instructing the second terminal to decrease the uplink transmitting power of the second terminal and/or decreasing the downlink transmitting power of the second terminal, and the device further includes:

a second receiving unit 220, configured to receive a decreasing interference indication sent by the second terminal;

a sending unit 230, configured to send the decreasing interference indication to the first wireless access device, so that the first wireless access device instructs the first terminal to decrease uplink transmitting power of the first terminal, or the first wireless access device decreases downlink transmitting power of the first terminal.

The adjusting the transmitting frequency band of the second terminal includes increasing the transmitting frequency band of the second terminal, and the device further includes:

a third receiving unit 240, configured to receive a decreasing interference indication sent by the second terminal;

a second sending unit 250, configured to send the decreasing interference indication to a third wireless access device when determining that the second terminal suffers neighbor cell interference from a third terminal, so that the third wireless access device decreases downlink transmitting power of the third terminal, or the third wireless access device instructs the third terminal to decrease uplink transmitting power of the third terminal.

Figure 17:
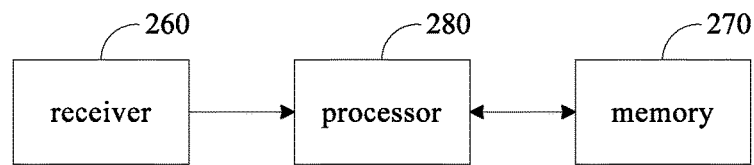
FIG. 17 is a schematic structural diagram of device 2 for eliminating inter-system neighbor cell interference provided in an embodiment of the present disclosure.

Referring to FIG. 17, it is a schematic structural diagram of device 2 for eliminating inter-system neighbor cell interference provided in an embodiment of the present disclosure. The device is a second wireless access device, as shown in the figure, the device includes:

a receiver 260, configured to receive a decreasing interference indication, where the decreasing interference indication is sent by a first wireless access device when the first wireless access device receives a first interference indication sent by a first terminal and determines that the first terminal suffers neighbor cell interference from a second terminal, the first interference indication is sent by the first terminal when the first terminal detects that neighbor cell interference caused by the second terminal to the first terminal is greater than or equal to a preset threshold, the first interference indication is used for indicating that the first terminal suffers the neighbor cell interference, the first wireless access device and the first terminal belong to a first wireless communication system, and the second wireless access device and the second terminal belong to a second wireless communication system;

a memory 270, configured to store information including a program;

a processor 280 coupled to the memory 270 and the receiver 260, configured to control an execution of the program, specifically including: executing a decreasing interference strategy to eliminate neighbor cell interference between the first terminal and the second terminal.

Figure 18:
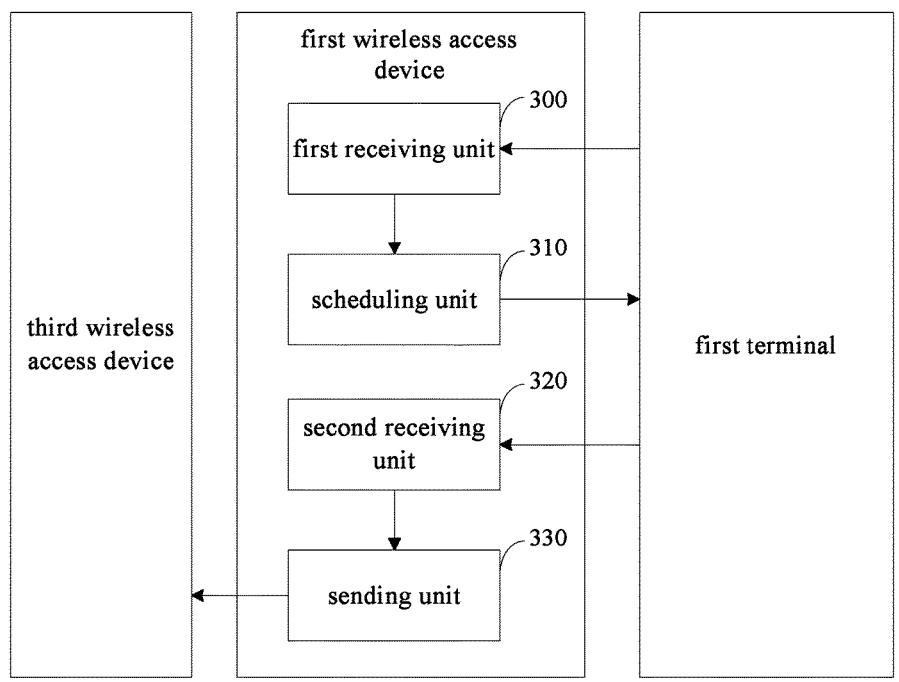
FIG. 18 is a functional block diagram of device 3 for eliminating inter-system neighbor cell interference provided in an embodiment of the present disclosure.

Referring to FIG. 18, it is a functional block diagram of device 3 for eliminating inter-system neighbor cell interference provided in an embodiment of the present disclosure. Corresponding to the elimination method shown in FIG. 12, the device is a first wireless access device, as shown in the figure, the device includes:

a first receiving unit 300, configured to receive a first interference indication, where the first interference indication is sent by a first terminal when the first terminal detects that neighbor cell interference caused by a second terminal to the first terminal is greater than or equal to a preset threshold, and the first interference indication is used for indicating that the first terminal suffers the neighbor cell interference, and the first wireless access device and the first terminal belong to a first wireless communication system;

a scheduling unit 310, configured to increase a frequency band of an uplink of the first terminal or a frequency band of a downlink of the first terminal to eliminate neighbor cell interference between the first terminal and the second terminal;

a second receiving unit 320, configured to receive a decreasing interference indication sent by the first terminal;

a sending unit 330, configured to send a decreasing interference indication to a third wireless access device corresponding to a third terminal when determining that the first terminal suffers neighbor cell interference from the third terminal, so that the third wireless access device decreases downlink transmitting power of the third terminal, or the third wireless access device instructs the third terminal to decrease uplink transmitting power of the third terminal, and the third terminal and the third wireless access device belong to a third wireless communication system.

Figure 19:
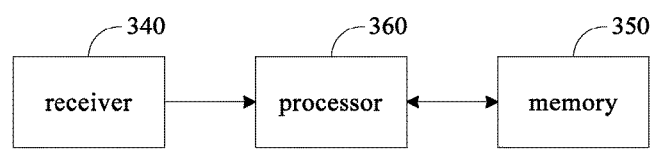
FIG. 19 is a schematic structural diagram of device 3 for eliminating inter-system neighbor cell interference provided in an embodiment of the present disclosure.

Referring to FIG. 19, it is a schematic structural diagram of device 3 for eliminating inter-system neighbor cell interference provided in an embodiment of the present disclosure. The device is a first wireless access device, as shown in the figure, the device includes:

a receiver 340, configured to receive a first interference indication, where the first interference indication is sent by a first terminal when the first terminal detects that neighbor cell interference caused by a second terminal to the first terminal is greater than or equal to a preset threshold, and the first interference indication is used for indicating that the first terminal suffers the neighbor cell interference, and the first wireless access device and the first terminal belong to a first wireless communication system;

a memory 350, configured to store information including a program;

a processor 360 coupled to the memory 350 and the receiver 340, configured to control an execution of the program, specifically including: increasing a frequency band of an uplink of the first terminal or a frequency band of a downlink of the first terminal to eliminate neighbor cell interference between the first terminal and the second terminal; receiving a decreasing interference indication sent by the first terminal; sending the decreasing interference indication to a third wireless access device corresponding to a third terminal when determining that the first terminal suffers neighbor cell interference from the third terminal, so that the third wireless access device decreases downlink transmitting power of a downlink of the third terminal, or the third wireless access device instructs the third terminal to decrease uplink transmitting power of the third terminal, and the third terminal and the third wireless access device belong to a third wireless communication system.

The technical solutions provided in the embodiments of the present disclosure have the following beneficial effects:

When a terminal finds itself suffering neighbor cell interference caused by that a terminal of other wireless communication systems communicates with a wireless access device serving the terminal, it initiates a process of eliminating interference to its own wireless access device to decrease uplink transmitting power of the terminal of the other wireless communication systems which cause interference or downlink transmitting power of the wireless access device of the other wireless communication systems which cause interference, or to adjust a frequency band of an uplink or a frequency band of a downlink of the other wireless communication systems, thereby realizing an objective of eliminating or decreasing neighbor cell interference; or, when the terminal initiates the process of eliminating interference to its own wireless access device, the wireless access device adjusts a frequency band of an uplink or a frequency band of a downlink of the terminal to eliminate or decrease the neighbor cell interference. Therefore, the technical solutions of the present disclosure are capable of eliminating or decreasing neighbor cell interference between two wireless communication systems, thereby ensuring a quality of service (QoS) during uplink communication or downlink communication between the terminal and the wireless access device, saving the uplink transmitting power or the downlink transmitting power and realizing an objective of extending a service life of a battery of the terminal or saving power consumption of the wireless access device.

The forgoing descriptions are merely preferred embodiments of the present disclosure, rather than the limitation to the present disclosure. Any modifications, equivalent substitutions, improvements and the like to be made within the spirit and principle of the present disclosure shall fall into the protection scope of the present disclosure.

What is claimed is:

1. A method for eliminating inter-system neighbor cell interference, wherein the method comprises:
receiving, by a first wireless access device, a first interference indication, wherein the first interference indication is sent by a first terminal when the first terminal detects that neighbor cell interference caused by a second terminal to the first terminal is greater than or equal to a preset threshold, the first interference indication is used for indicating that the first terminal suffers the neighbor cell interference, and the first wireless access device and the first terminal belong to a first wireless communication system; and
sending, by the first wireless access device, a decreasing interference indication to a second wireless access device corresponding to the second terminal when it is determined that the first terminal suffers the neighbor cell interference from the second terminal, to enable the second wireless access device to execute a decreasing interference strategy to eliminate neighbor cell interference between the first terminal and the second terminal, wherein the second wireless access device and the second terminal belong to a second wireless communication system, and frequency bands of the first wireless communication system and the second wireless communication system are adjacent.

2. The method according to claim 1, wherein,
the first wireless communication system is a wireless local area network (WLAN) system, and the second wireless communication system is a cellular network system; or
the first wireless communication system is a cellular network system, and the second wireless communication system is a WLAN system; or
the first wireless communication system is a WLAN system, and the second wireless communication system is a WLAN system; or
the first wireless communication system is a cellular network system, and the second wireless communication system is a cellular network system.

3. The method according to claim 1, wherein the decreasing interference strategy comprises at least one of the following strategies:
instructing the second terminal to decrease uplink transmitting power of the second terminal;
decreasing downlink transmitting power of the second wireless access device;
adjusting a frequency band of an uplink of the second terminal; and
adjusting a frequency band of a downlink of the second terminal.

4. The method according to claim 3, wherein the decreasing interference strategy is instructing the second terminal to decrease the uplink transmitting power of the second terminal or decreasing the downlink transmitting power of the second wireless access device, and after the sending the decreasing interference indication to the second wireless access device corresponding to the second terminal, the method further comprises:
receiving, by the first wireless access device, a decreasing interference indication sent by the second wireless access device, wherein the decreasing interference indication is sent from the second terminal to the second wireless access device; and
sending, by the first wireless access device, the decreasing interference indication to the first terminal, so that the first terminal decreases uplink transmitting power of the first terminal, or the first wireless access device decreases downlink transmitting power of the first wireless access device.

5. The method according to claim 1, wherein before the sending, by the first wireless access device, the decreasing interference indication to the second wireless access device corresponding to the second terminal, the method further comprises:
receiving, by the first wireless access device, interference information of neighbor cell interference sent by the first terminal; and
determining, by the first wireless access device, that the first terminal suffers the neighbor cell interference from the second terminal according to the interference information of the neighbor cell interference.

6. A method for eliminating inter-system neighbor cell interference, wherein the method comprises:

receiving, by a second wireless access device, a decreasing interference indication, wherein the decreasing interference indication is sent by a first wireless access device when the first wireless access device receives a first interference indication sent by a first terminal and determines that the first terminal suffers neighbor cell interference from a second terminal, the first interference indication is sent by the first terminal when the first terminal detects that neighbor cell interference caused by the second terminal to the first terminal is greater than or equal to a preset threshold, the first interference indication is used for indicating that the first terminal suffers the neighbor cell interference, the first wireless access device and the first terminal belong to a first wireless communication system, and the second wireless access device and the second terminal belong to a second wireless communication system, and frequency bands of the first wireless communication system and the second wireless communication system are adjacent; and executing, by the second wireless access device, a decreasing interference strategy to eliminate neighbor cell interference between the first terminal and the second terminal.

7. The method according to claim 6, wherein, the first wireless communication system is a wireless local area network (WLAN) system, and the second wireless communication system is a cellular network system; or the first wireless communication system is a cellular network system, and the second wireless communication system is a WLAN system; or the first wireless communication system is a WLAN system, and the second wireless communication system is a WLAN system; or the first wireless communication system is a cellular network system, and the second wireless communication system is a cellular network system.

8. The method according to claim 6, wherein the decreasing interference strategy comprises at least one of the following strategies:

instructing the second terminal to decrease uplink transmitting power of the second terminal;

decreasing downlink transmitting power of the second wireless access device;

adjusting a frequency band of an uplink of the second terminal; and adjusting a frequency band of a downlink of the second terminal.

9. The method according to claim 8, wherein the decreasing interference strategy is instructing the second terminal to decrease the uplink transmitting power of the second terminal and/or decreasing the downlink transmitting power of the second wireless access device, and after the executing, by the second wireless access device, the decreasing interference strategy, the method further comprises:

receiving, by the second wireless access device, a decreasing interference indication sent by the second terminal; and sending, by the second wireless access device, the decreasing interference indication to the first wireless access device, so that the first wireless access device instructs the first terminal to decrease uplink transmitting power of the first terminal, or the first wireless access device decreases downlink transmitting power of the first wireless access device.

10. The method according to claim 8, wherein the adjusting the frequency band of the uplink of the second terminal comprises increasing the frequency band of the uplink of the second terminal, or the adjusting the frequency band of the downlink of the second terminal comprises increasing the frequency band of the downlink of the second terminal, and after the executing, by the second wireless access device, the decreasing interference strategy, the method further comprises:

receiving, by the second wireless access device, a decreasing interference indication sent by the second terminal; and sending, by the second wireless access device, the decreasing interference indication to a third wireless access device when determining that the second terminal suffers neighbor cell interference from a third terminal, so that the third wireless access device decreases downlink transmitting power of the third wireless access device, or the third wireless access device instructs the third terminal to decrease uplink transmitting power of the third terminal.

11. A device for eliminating inter-system neighbor cell interference, wherein the device comprises:

a receiver, configured to receive a first interference indication, wherein the first interference indication is sent by a first terminal when the first terminal detects that neighbor cell interference caused by a second terminal to the first terminal is greater than or equal to a preset threshold, the first interference indication is used for indicating that the first terminal suffers the neighbor cell interference, and the device and the first terminal belong to a first wireless communication system; and a transmitter, configured to send a decreasing interference indication to a second wireless access device corresponding to the second terminal when determining that the first terminal suffers the neighbor cell interference from the second terminal, so that the second wireless access device executes a decreasing interference strategy to eliminate neighbor cell interference between the first terminal and the second terminal, and the second wireless access device and the second terminal belong to a second wireless communication system, and frequency bands of the first wireless communication system and the second wireless communication system are adjacent.

12. The device according to claim 11, wherein, the first wireless communication system is a wireless local area network (WLAN) system, and the second wireless communication system is a cellular network system; or the first wireless communication system is a cellular network system, and the second wireless communication system is a WLAN system; or the first wireless communication system is a WLAN system, and the second wireless communication system is a WLAN system; or the first wireless communication system is a cellular network system, and the second wireless communication system is a cellular network system.

13. The device according to claim 11, wherein the decreasing interference strategy comprises at least one of the following strategies:

instructing the second terminal to decrease uplink transmitting power of the second terminal;

decreasing downlink transmitting power of the device;

adjusting a frequency band of an uplink of the second terminal; and adjusting a frequency band of a downlink of the second terminal.

14. The device according to claim 13, wherein the decreasing interference strategy is instructing the second terminal to decrease the uplink transmitting power of the second terminal or decreasing the downlink transmitting power of the second wireless access device, and
- the receiver is further configured to receive a decreasing interference indication sent by the second wireless access device, wherein the decreasing interference indication is sent from the second terminal to the second wireless access device; and
- the transmitter is further configured to send the decreasing interference indication to the first terminal, so that the first terminal decreases uplink transmitting power of the first terminal, or the device decreases downlink transmitting power of the device.

15. The device according to claim 11, wherein
- the receiver is further configured to receive interference information of neighbor cell interference sent by the first terminal; and
- the transmitter is further configured to determine that the first terminal suffers the neighbor cell interference from the second terminal according to the interference information of the neighbor cell interference.

16. A device for eliminating inter-system neighbor cell interference, wherein the device comprises:
- a receiver, configured to receive a decreasing interference indication, wherein the decreasing interference indication is sent by a first wireless access device when the first wireless access device receives a first interference indication sent by a first terminal and determines that the first terminal suffers neighbor cell interference from a second terminal, the first interference indication is sent by the first terminal when the first terminal detects that neighbor cell interference caused by the second terminal to the first terminal is greater than or equal to a preset threshold, the first interference indication is used for indicating that the first terminal suffers the neighbor cell interference, the first wireless access device and the first terminal belong to a first wireless communication system, and the device and the second terminal belong to a second wireless communication system, and frequency bands of the first wireless communication system and the second wireless communication system are adjacent; and
- a processor, configured to execute a decreasing interference strategy to eliminate neighbor cell interference between the first terminal and the second terminal.

17. The device according to claim 16, wherein,
- the first wireless communication system is a wireless local area network (WLAN) system, and the second wireless communication system is a cellular network system; or
- the first wireless communication system is a cellular network system, and the second wireless communication system is a WLAN system; or
- the first wireless communication system is a WLAN system, and the second wireless communication system is a WLAN system; or
- the first wireless communication system is a cellular network system, and the second wireless communication system is a cellular network system.

18. The device according to claim 16, wherein the decreasing interference strategy comprises at least one of the following strategies:
- instructing the second terminal to decrease uplink transmitting power of the second terminal;
- decreasing downlink transmitting power of the device;
- adjusting a frequency band of an uplink of the second terminal; and
- adjusting a frequency band of a downlink of the second terminal.

19. The device according to claim 18, wherein the decreasing interference strategy is instructing the second terminal to decrease the uplink transmitting power of the second terminal and/or decreasing the downlink transmitting power of the device, and
- the receiver is further configured to receive a decreasing interference indication sent by the second terminal; and
- the device further comprises:
- a transmitter, configured to send the decreasing interference indication to the first wireless access device, so that the first wireless access device instructs the first terminal to decrease uplink transmitting power of the first terminal, or the first wireless access device decreases downlink transmitting power of the first wireless access device.

20. The device according to claim 18, wherein the adjusting the frequency band of the uplink of the second terminal comprises increasing the frequency band of the uplink of the second terminal, or the adjusting the frequency band of the downlink of the second terminal comprises increasing the frequency band of the downlink of the second terminal, and
- the receiver is further configured to receive a decreasing interference indication sent by the second terminal; and
- the device further comprises:
- a transmitter, configured to send the decreasing interference indication to a third wireless access device when determining that the second terminal suffers neighbor cell interference from a third terminal, so that the third wireless access device decreases downlink transmitting power of the third wireless access device, or the third wireless access device instructs the third terminal to decrease uplink transmitting power of the third terminal.

* * * * *